(12) United States Patent
Omoto et al.

(10) Patent No.: US 7,980,361 B2
(45) Date of Patent: Jul. 19, 2011

(54) LUBRICATING SYSTEM AND LUBRICATING METHOD

(75) Inventors: Masaki Omoto, Aichi (JP); Tatsushi Okumura, Nagoya (JP); Hideki Aoyama, Toyoaki (JP); Akira Kokubo, Tokai (JP)

(73) Assignee: Aichi Machine Industry Co., Ltd., Nagoya-shi (JP)

( * ) Notice: Subject to any disclaimer, the term of this patent is extended or adjusted under 35 U.S.C. 154(b) by 1041 days.

(21) Appl. No.: 11/776,038

(22) Filed: Jul. 11, 2007

(65) Prior Publication Data

US 2008/0035428 A1 Feb. 14, 2008

(30) Foreign Application Priority Data

Aug. 11, 2006 (JP) .................................. 2006-220734

(51) Int. Cl.
  *F16N 29/00* (2006.01)
  *F16H 57/04* (2010.01)
(52) U.S. Cl. ............................. 184/6.12; 184/6; 184/31
(58) Field of Classification Search ............ 184/6, 6.11, 184/6.12, 6.23, 6.24, 6.26, 31
See application file for complete search history.

(56) References Cited

U.S. PATENT DOCUMENTS

| 2,848,284 | A | * | 8/1958 | Atkinson et al. | 384/466 |
| 3,223,196 | A | * | 12/1965 | Stott | 184/6 |
| 4,848,177 | A | * | 7/1989 | Miura et al. | 74/467 |
| 4,964,489 | A | | 10/1990 | Patel | |
| 5,489,190 | A | * | 2/1996 | Sullivan | 415/175 |
| 5,899,827 | A | | 5/1999 | Nakano et al. | |
| 6,059,682 | A | | 5/2000 | Friedmann et al. | |
| 7,455,150 | B1 | * | 11/2008 | Gekht et al. | 184/11.2 |

FOREIGN PATENT DOCUMENTS

| DE | 3321732 C2 | 12/1984 |
| DE | 19756253 A1 | 6/1998 |
| GB | 2204369 A | 11/1988 |
| JP | 3274916 B | 2/2002 |

* cited by examiner

*Primary Examiner* — Michael Mansen
*Assistant Examiner* — Robert Reese
(74) *Attorney, Agent, or Firm* — Global IP Counselors, LLP

(57) ABSTRACT

A lubricating system is adapted to supply lubricating oil to a lip portion of an oil-seal member for preventing the lubricating oil from leaking out of a case. The lubricating system includes a rotating member, a bearing, a scraping member, and a guiding section. The rotating member is configured and arranged to be rotatably housed within the case and to slidably engage the lip portion of the oil-seal member. The bearing rotatably supports the rotating member. The scraping member is configured and arranged to scrape the lubricating oil discharged from the bearing. The guiding section is configured and arranged to guide the lubricating oil scraped by the scraping member to the lip portion of the oil-seal member.

13 Claims, 26 Drawing Sheets

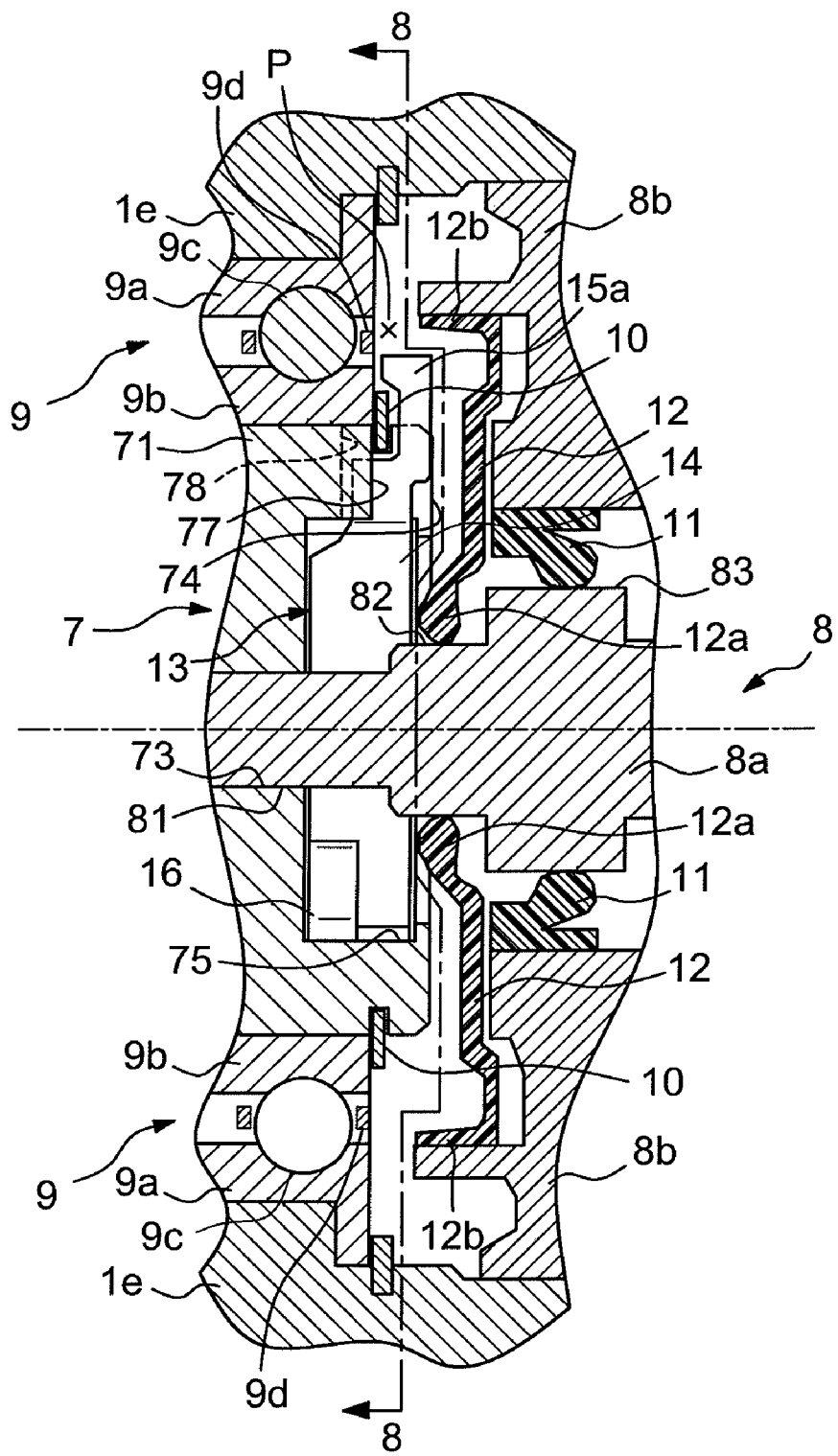
F I G. 2

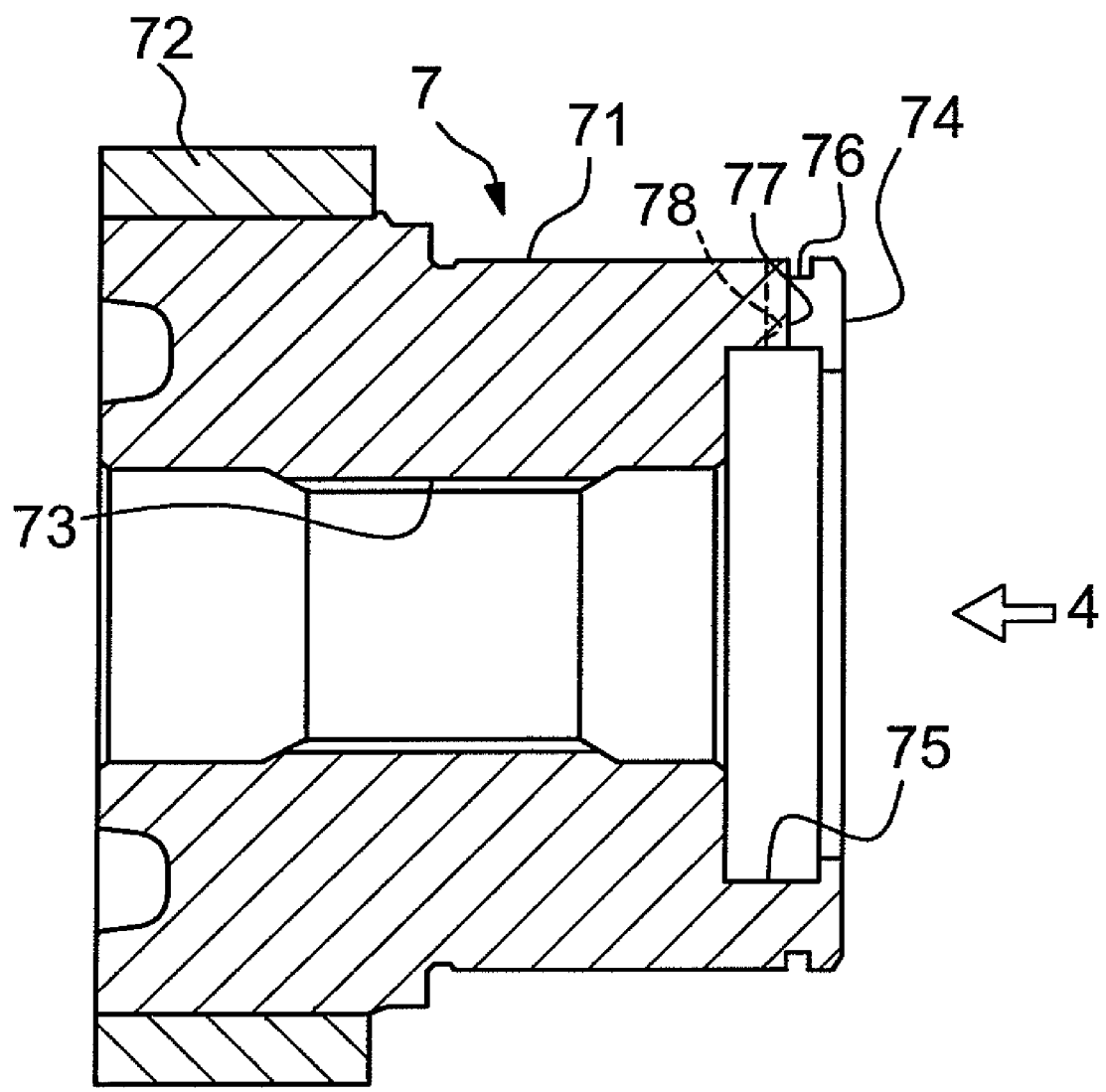
F I G. 3

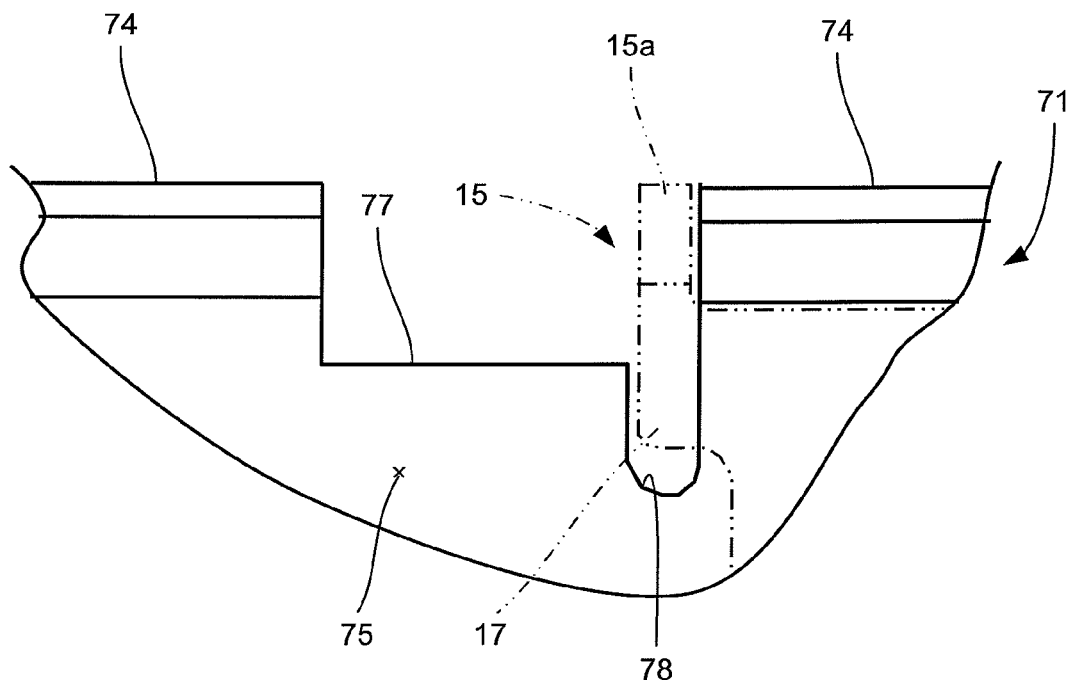
F I G. 5
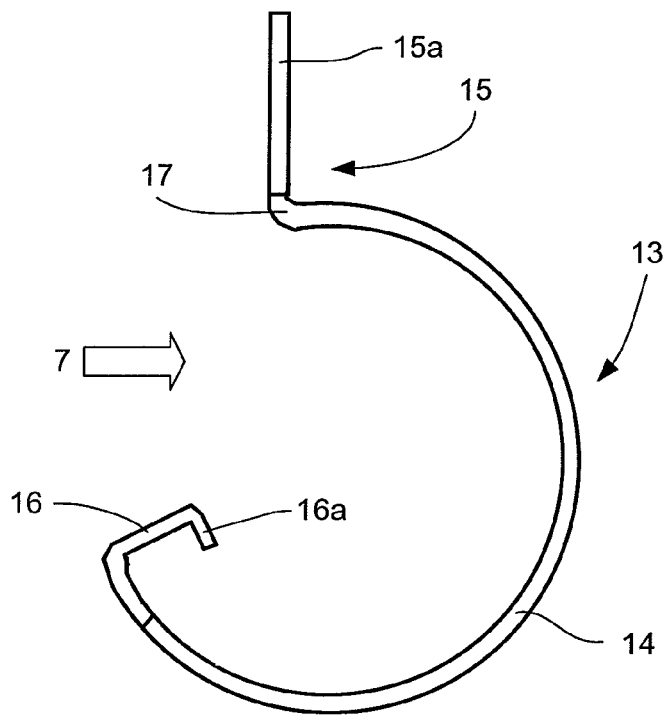
F I G. 6

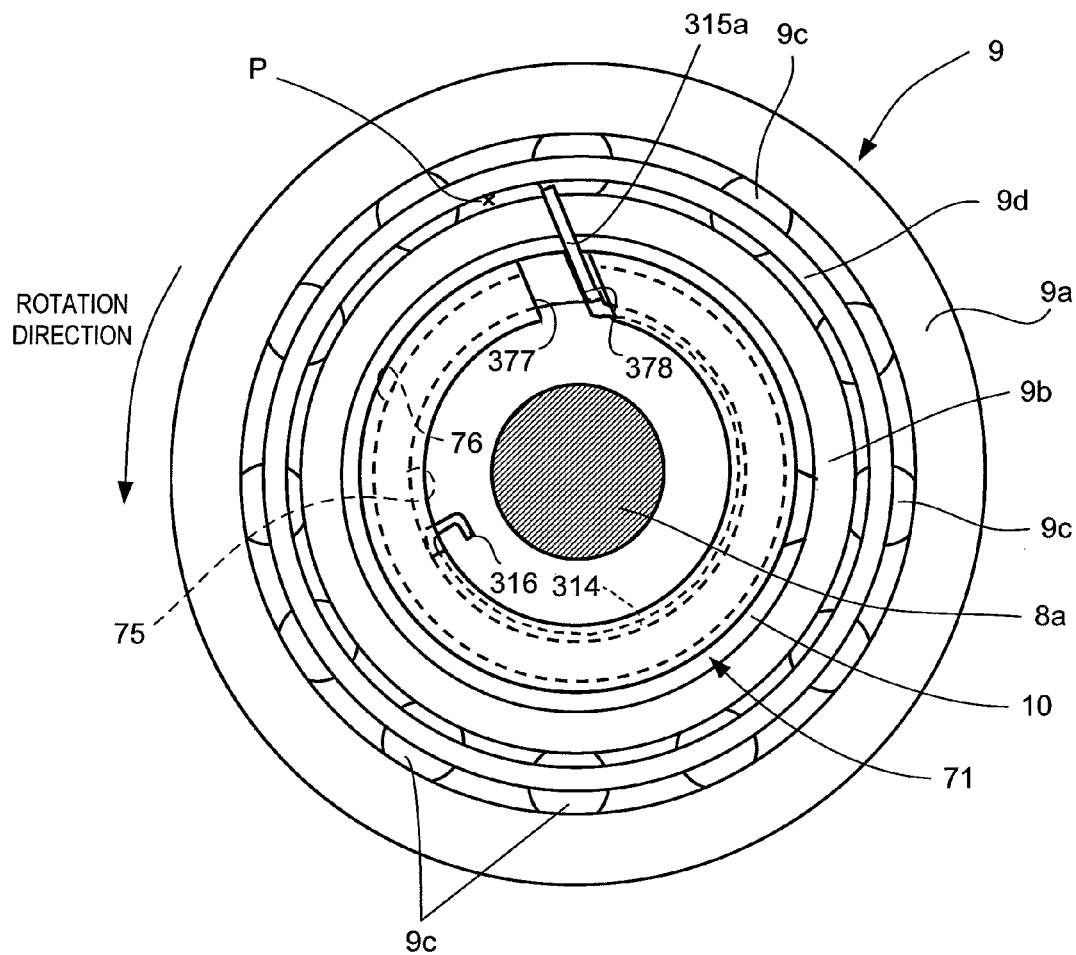
F I G. 17

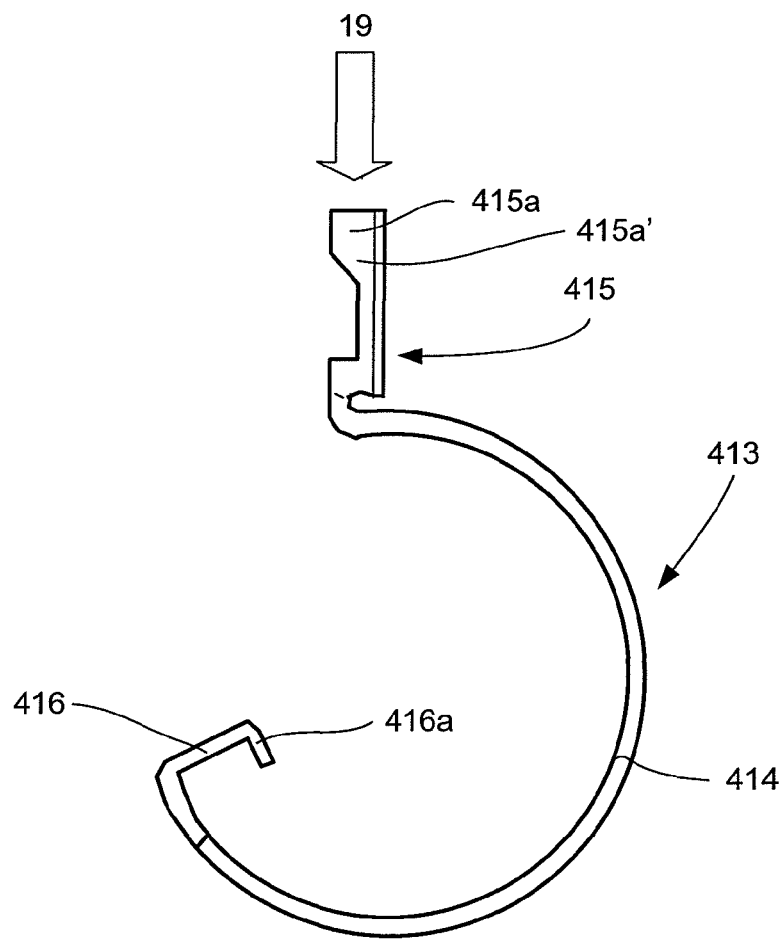
F I G. 18
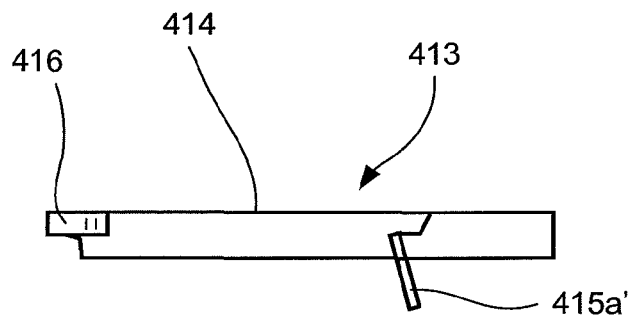
F I G. 19

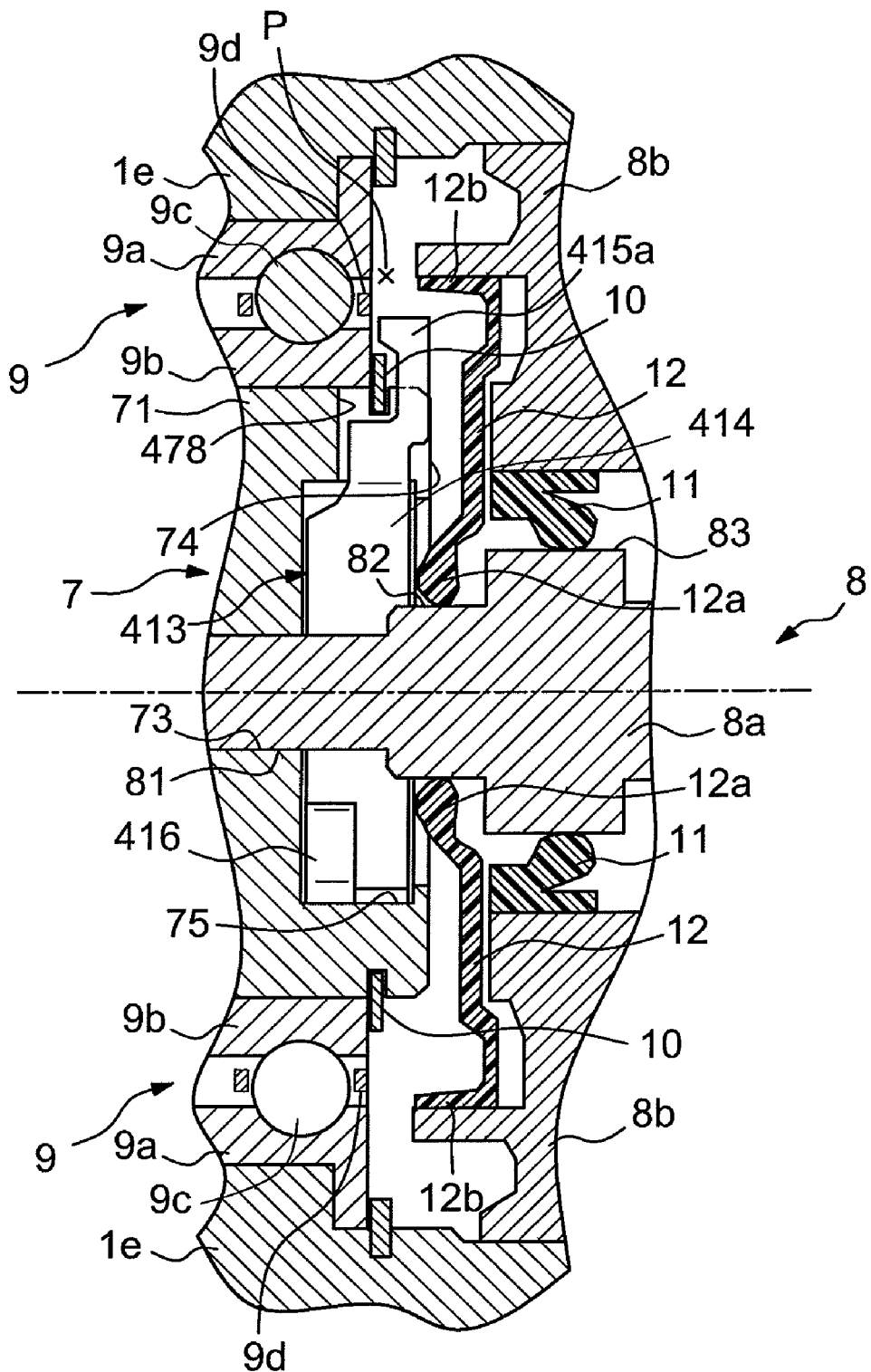
F I G. 20

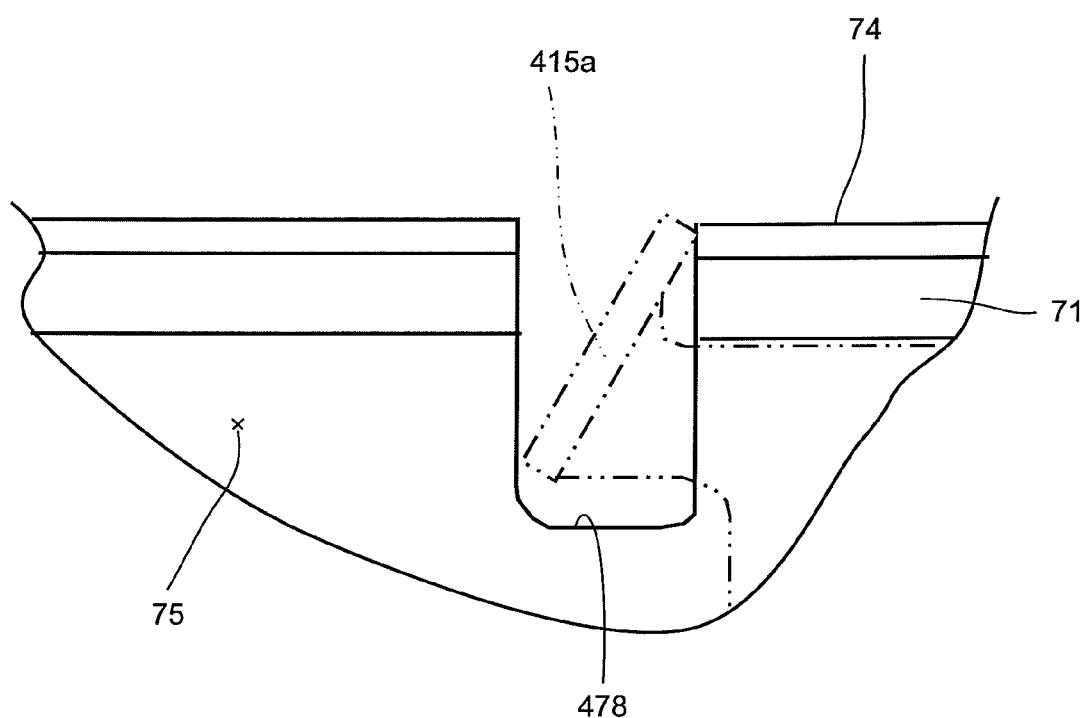
F I G. 23

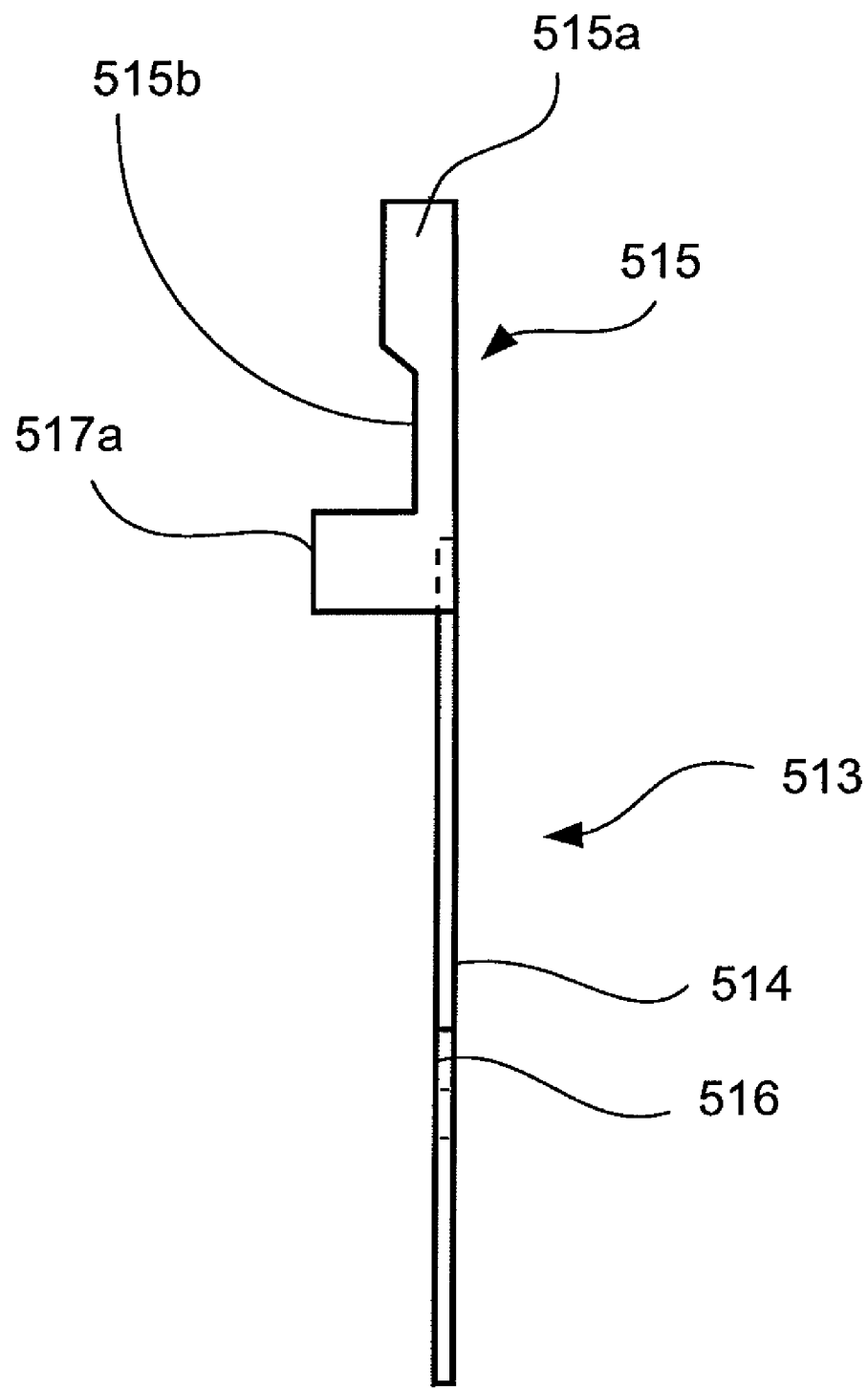
F I G. 25

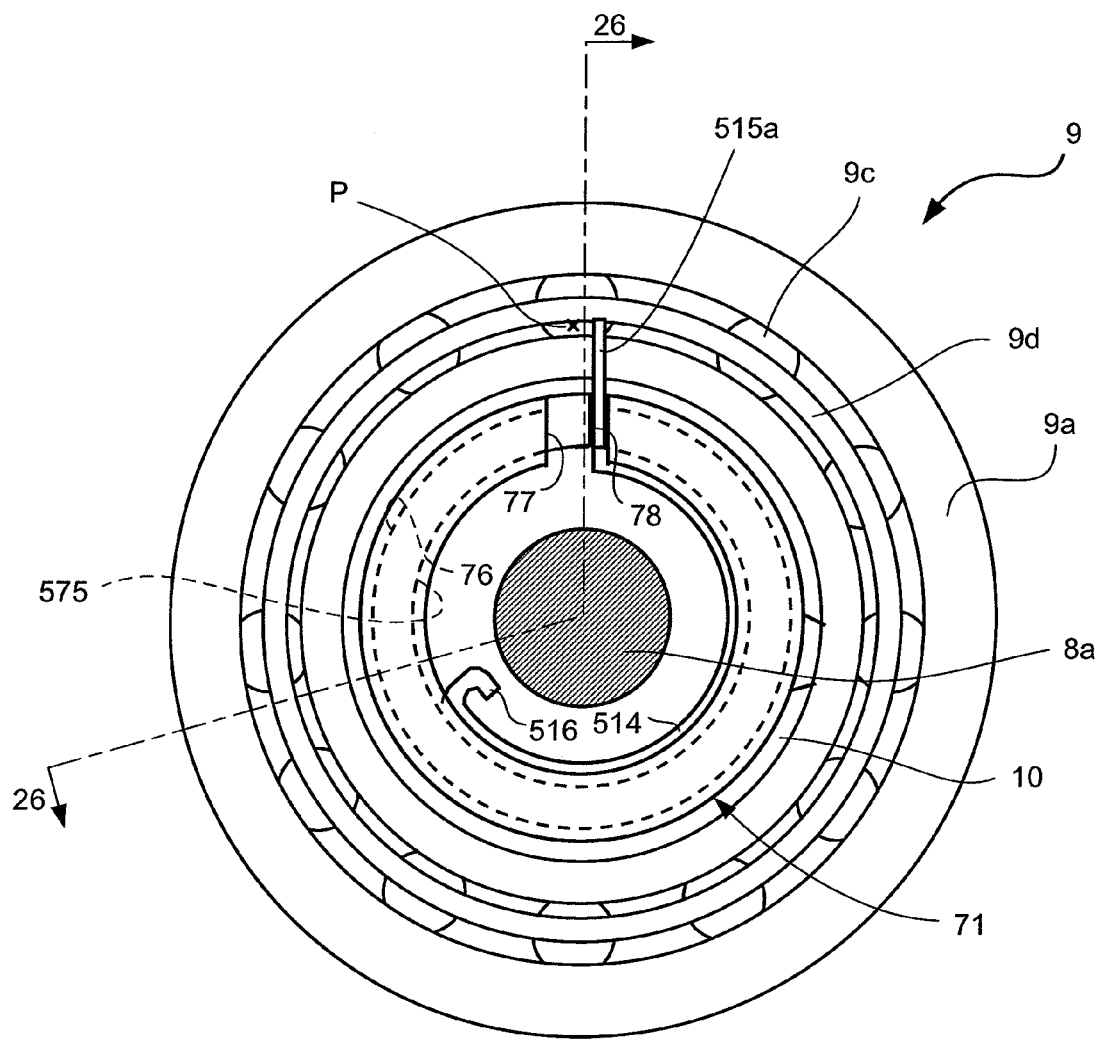
F I G. 28

# LUBRICATING SYSTEM AND LUBRICATING METHOD

CROSS-REFERENCE TO RELATED APPLICATIONS

This application claims priority to Japanese Patent Application No. 2006-220734 filed on Aug. 11, 2006. The entire disclosure of Japanese Patent Application No. 2006-220734 is hereby incorporated herein by reference.

BACKGROUND OF THE INVENTION

1. Field of the Invention

The present invention generally relates to a lubricating system and a lubricating method. More specifically, the present invention relates to a lubricating system and a lubricating method adapted to lubricate parts of a vehicle.

2. Background Information

Japanese Patent No. 3274916 discloses a conventional lubricating system used in a transfer case of a vehicle. An oil seal is provided so that lubricating oil does not leak from a portion of a rotating shaft rotatably supported in the transfer case via a bearing, which protrudes out of the case. The conventional lubricating system disclosed in this reference is arranged to lubricate a lip portion of the oil seal in the transfer case. In such conventional lubricating system, the lubricating oil scraped along by gears is introduced into an empty space formed between the oil seal and the bearing, and thus, a relatively large amount of the lubricating oil can be efficiently supplied to the lip portion.

In view of the above, it will be apparent to those skilled in the art from this disclosure that there exists a need for an improved lubricating system and lubricating method. This invention addresses this need in the art as well as other needs, which will become apparent to those skilled in the art from this disclosure.

SUMMARY OF THE INVENTION

In the conventional lubricating system disclosed in the above mentioned reference, it is necessary to provide an oil receiver in order to introduce the lubricating oil scraped along by the gears into the empty space formed between the oil seal and the bearing. Problems have arisen in that the size of an apparatus provided with such a conventional lubricating system inevitably increases in proportion to the space required for installing the oil receiver.

The present invention was contrived in light of the aforementioned problems in the prior art. One object of the present invention is to ensure lubricity of a lip portion of an oil seal without the size of the apparatus provided with the lubricating system being increased. Another object of the present invention is to efficiently supply lubricating oil to the lip portion of the oil seal.

In order to achieve the above mentioned objects of the present invention, a lubricating system is provided that is adapted to supply lubricating oil to a lip portion of an oil-seal member for preventing the lubricating oil from leaking out of a case. The lubricating system includes a rotating member, a bearing, a scraping member, and a guiding section. The rotating member is configured and arranged to be rotatably housed within the case and to slidably engage the lip portion of the oil-seal member. The bearing rotatably supports the rotating member. The scraping member is configured and arranged to scrape the lubricating oil discharged from the bearing. The guiding section is configured and arranged to guide the lubricating oil scraped by the scraping member to the lip portion of the oil-seal member.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 2 is an enlarged cross sectional view of the transmission at an area of an input shaft of the transfer device taken along a section line 2-2 in FIG. 8 in accordance with the first embodiment of the present invention;

FIG. 3 is an enlarged axial cross sectional view of a driven transmission gear of the transmission in accordance with the first embodiment of the present invention;

FIG. 5 is an enlarged partial structural diagram of the driven transmission gear as viewed in a direction of an arrow 5 in FIG. 4 in accordance with the first embodiment of the present invention;

FIG. 6 is an axial end elevational view of a scraping member of the lubricating system in accordance with the first embodiment of the present invention;

FIG. 17 is a cross sectional view, similar to FIG. 8, of the transmission in accordance with the fourth embodiment of the present invention;

FIG. 18 is an axial end elevational view of a scraping member of a lubricating system in accordance with a fifth embodiment of the present invention;

FIG. 19 is a top plan view of the scraping member as viewed in a direction of an arrow 19 in FIG. 18 in accordance with the fifth embodiment of the present invention;

FIG. 20 is an enlarged cross sectional view of the transmission at an area of an input shaft of the transfer device in accordance with the fifth embodiment of the present invention;

FIG. 23 is an enlarged partial structural diagram of the driven transmission gear as viewed in a direction of an arrow 23 in FIG. 22 in accordance with the fifth embodiment of the present invention;

FIG. 25 is an elevational view of the scraping member as viewed in a direction of an arrow 25 in FIG. 24 in accordance with the sixth embodiment of the present invention;

FIG. 28 is a cross sectional view of the transmission taken along a section line 28-28 in FIG. 26 (with selected parts removed for purpose of illustration) in accordance with the sixth embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
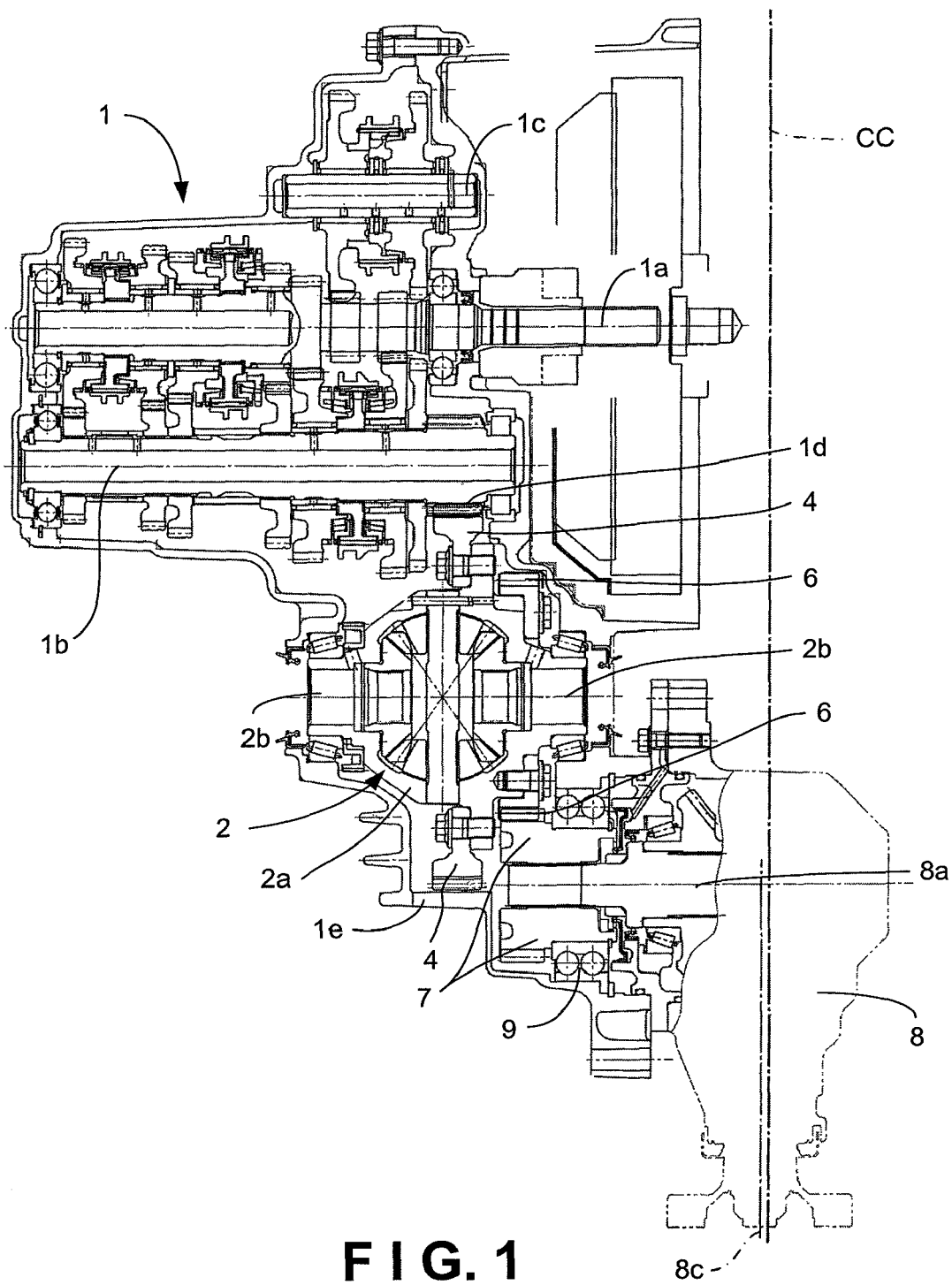
FIG. 1 is a schematic cross sectional view a vehicle transmission having a transfer device with a lubricating system in accordance with a first embodiment of the present invention.

Referring initially to FIG. 1, a transmission 1 is illustrated that is provided with a lubricating system in accordance with a first embodiment of the present invention. FIG. 1 is an overall schematic cross sectional view of a motive force transmitting apparatus of a vehicle including the transmission 1.

As shown in FIG. 1, the transmission 1 includes an input shaft 1a, an output shaft 1b, a reverse idler shaft 1c, an output gear 1d and a case 1e. Moreover, the motive-force transmitting apparatus further includes a differential device 2 housed within a case 2a, a forward-wheel shaft 2b, a ring gear 4, a transmission gear 6, a driven transmission gear 7, a transfer device 8 and a bearing 9.

A motive force (drive force) is inputted from an engine of the vehicle to the input shaft 1a. The output shaft 1b and the reverse idler shaft 1c are arranged to be parallel to the input shaft 1a. The motive force from the engine is transmitted to the output shaft 1b using different transmission gear ratios via a plurality of gears provided to the input shaft 1a and the output shaft 1b. The output gear 1d is provided to the output shaft 1b. The ring gear 4 is engaged with the output gear 1d. The ring gear 4 is screwed to the case 2a of the differential device 2. The differential device 2 is rotatably provided within the case 1e of the transmission 1.

The forward-wheel shaft 2b is linked to the differential device 2 and to the front wheels (not shown) of the vehicle. Thus, the motive force is transmitted to the front wheels via the differential device 2.

The transmission gear 6 is screwed to the case 2a of the differential device 2. The transmission gear 6 is disposed adjacent to the ring gear 4, which is also fixed to the case 2a. The transmission gear 6 is arranged to have a smaller diameter than the ring gear 4.

The driven transmission gear 7 is positioned so as to overlap the ring gear 4 in a radial direction. The driven transmission gear 7 is configured and arranged to rotate within the transmission case 1e via the bearing 9. The driven transmission gear 7 is engaged with the transmission gear 6 as shown in FIG. 1.

The transfer device 8 is coupled to an input shaft 8a (rotating shaft) that is connected with a spline engagement to an inner circumferential surface of the driven transmission gear 7. Thus, the input shaft 8a and the driven transmission gear 7 rotate together as an integral unit. The input shaft 8a of the transfer device 8 is linked to an output shaft 8c of the transfer device 8 extending in the longitudinal direction of the vehicle at a position in the vicinity of a transverse center CC of the vehicle. The transfer device 8 is housed inside of a transfer case 8b. In the first embodiment, the input shaft 8a and the driven transmission gear 7 preferably constitute a rotating member of the present invention.

The transfer device 8 is fixedly coupled with screw engagement to the transmission case 1e. The transfer device 8 is configured and arranged to transmit the motive force through the output shaft 8c of the transfer device to a rear-wheel shaft of the vehicle.

The transmission 1, the differential device 2, and the transfer device 8 are conventional components that are well known in the art. Since the transmission 1, the differential device 2, and the transfer device 8 are well known in the art, these structures will not be discussed or illustrated in detail herein.

In the first embodiment of the present invention, the lubricating system is provided in the transmission 1 in an area in the vicinity of a connecting portion between the transfer device 8 and the driven transmission gear 7. Referring now to FIGS. 2 to 8, structures of the lubricating system of the first embodiment of the present invention will be described in more detail. FIG. 2 is an enlarged cross sectional view of the transmission 1 at an area of the input shaft 8a of the transfer device 8 taken along a section line 2-2 in FIG. 8.

As shown in FIG. 2, a portion of the input shaft 8a of the transfer device 8 that protrudes into the transmission case 1e includes a spline-engagement part 81, a sliding surface 82 and a sliding surface 83. The spline-engagement part 81 has a plurality of splines formed on an outer circumference of a distal end part of the input shaft 8a. The sliding surface 82 has a larger diameter than the spline-engagement part 81. The sliding surface 82 is disposed with respect to the spline-engagement part 81 on a side closer to the transfer device 8 (right side in FIG. 2). The sliding surface 83 has an even larger diameter than the sliding surface 82. The sliding surface 83 is disposed with respect to the sliding surface 82 on the side closer to the transfer device 8 (right side in FIG. 2).

The driven transmission gear 7 includes a boss part 71 having a plurality of spline bore part 73. Thus, the spline-engagement part 81 of the input shaft 8a forms a spline engagement within the spline bore part 73 of the boss part 71 of the driven transmission gear 7.

Figure 4:
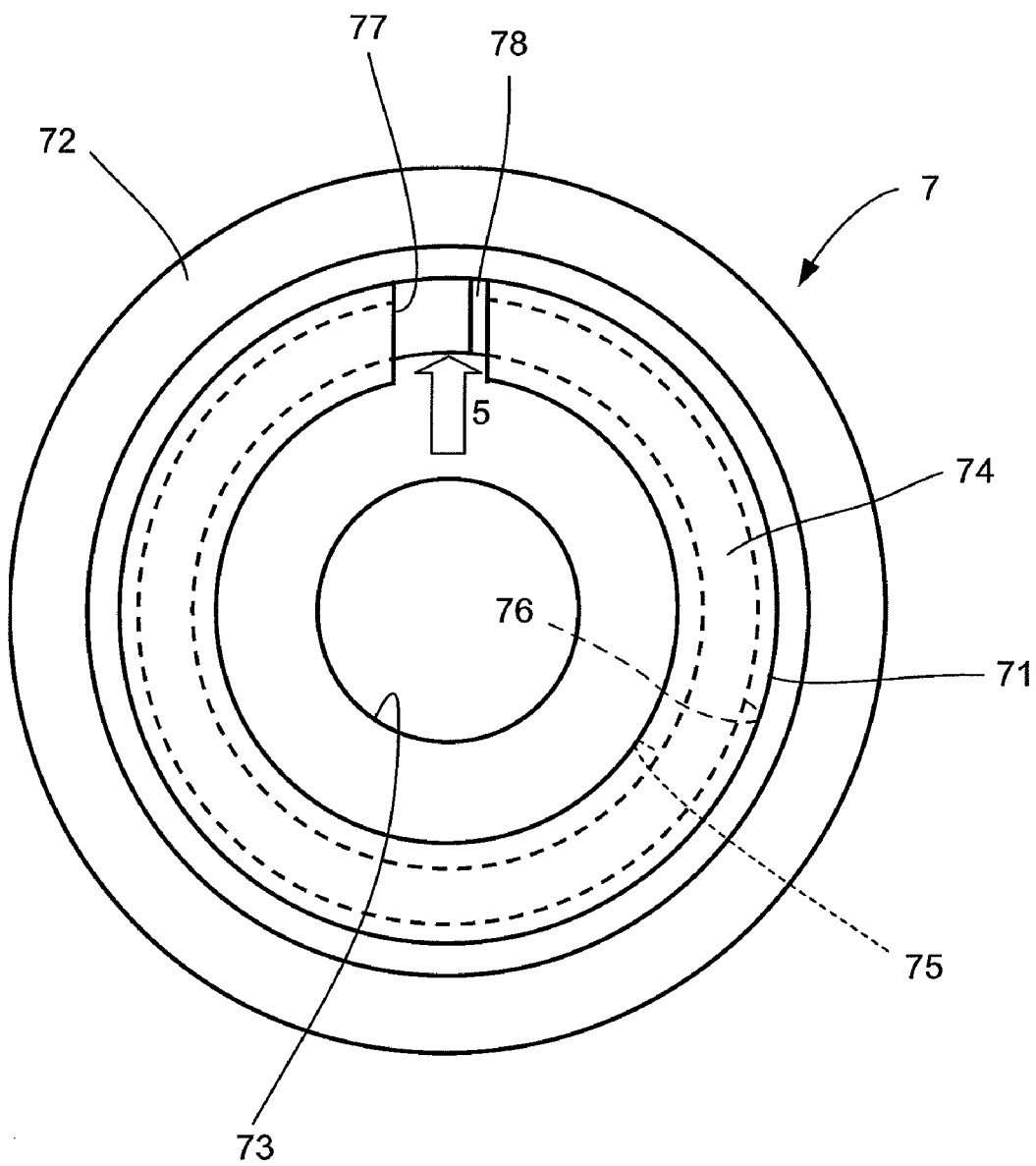
FIG. 4 is an axial end elevational view of the driven transmission gear as viewed in a direction of an arrow 4 in FIG. 3 in accordance with the first embodiment of the present invention.

FIG. 3 is an enlarged axial cross sectional view of the driven transmission gear 7 of the transmission 1. FIG. 4 is an axial end elevational view of the driven transmission gear 7 as viewed in a direction of an arrow 4 in FIG. 3. FIG. 5 is an enlarged partial structural diagram of the driven transmission gear 7 as viewed in a direction of an arrow 5 in FIG. 4.

As shown in FIG. 3, the driven transmission gear 7 includes the boss part 71, a gear 72, the spline bore part 73, an axial end surface 74, an annular groove 75, a snap ring groove 76, a radial groove 77 (guiding section), an a radial notch part 78.

The gear 72 is formed on the outer circumferential surface of the boss part 71. The spline bore part 73, which engages with the spline-engagement part 81 of the input shaft 8a of the transfer device 8, are formed on the inner circumferential surface of the boss part 71. The annular groove 75 is formed concentrically with the spline bore part 73 on the inner circumferential surface of the boss part 71 adjacent to the axial end surface 74. The snap ring groove 76 is formed on an outer circumferential surface of the boss part 71 at a position corresponding to the annular groove 75. In other words, the snap ring groove 76 is formed on an outer circumferential surface of the boss part 71 at a position adjacent to the axial end surface 74 as shown in FIG. 3.

Referring back to FIG. 2, the bearing includes an outer race 9a, an inner race 9b, and a plurality of bearing balls 9c (smoothing member) interposed between the outer race 9a and the inner race 9b. The inner race 9b of the bearing 9 is engaged with the outer circumferential surface of the boss part 71, and the outer race 9a is engaged with the transmission case 1e. The bearing balls 9c supported by a ball holder 9d. The bearing 9 is securely attached to the driven transmission gear 7 by being inserted within the outer circumferential surface of the boss part 71 by press-fitting or the like. A snap ring 10 is provided which is fitted in the snap ring groove 76 to prevent displacement of the bearing 9 in the axial direction.

The input shaft 8a of the transfer device 8 is configured and arranged to rotate integrally with the driven transmission gear 7 via the bearing 9.

As shown in FIG. 2, an annular sealing member 11 is provided between the input shaft 8a and the transfer case 8b. The sealing member 11 is configured and arranged to slides against the sliding surface 83 of the input shaft 8a of the transfer device 8 and to prevent leakage of lubricating oil. Moreover, an annular oil-seal member 12 is also disposed between the input shaft 8a and the transfer case 8b on a side toward the driven transmission gear 7 with respect to the sealing member 11. The oil-seal member 12 includes a lip portion 12a in a radial inner portion thereof. A radial outer portion of the oil seal member 12 (radial outer portion of the lip portion 12a) is rigidly formed to slide against the sliding surface 82 of the input shaft 8a. The oil-seal member 12 further includes a fitting part 12b on the radial outer circumference side of the lip portion 12a. The fitting part 12b abuts against the transfer case 8b as shown in FIG. 2.

As shown in FIGS. 3 to 5, the radial groove 77 is formed on the boss part 71 so that the radial groove 77 forms a recessed section on the axial end surface 74. The radial groove 77 extends through the annular groove 75 of the boss part 71 in the radial direction as shown in FIGS. 4 and 5. The radial notch part 78 is formed on a portion of the radial groove 77 so that the radial notch part 78 is further indented or recessed toward the gear 72.

Figure 7:
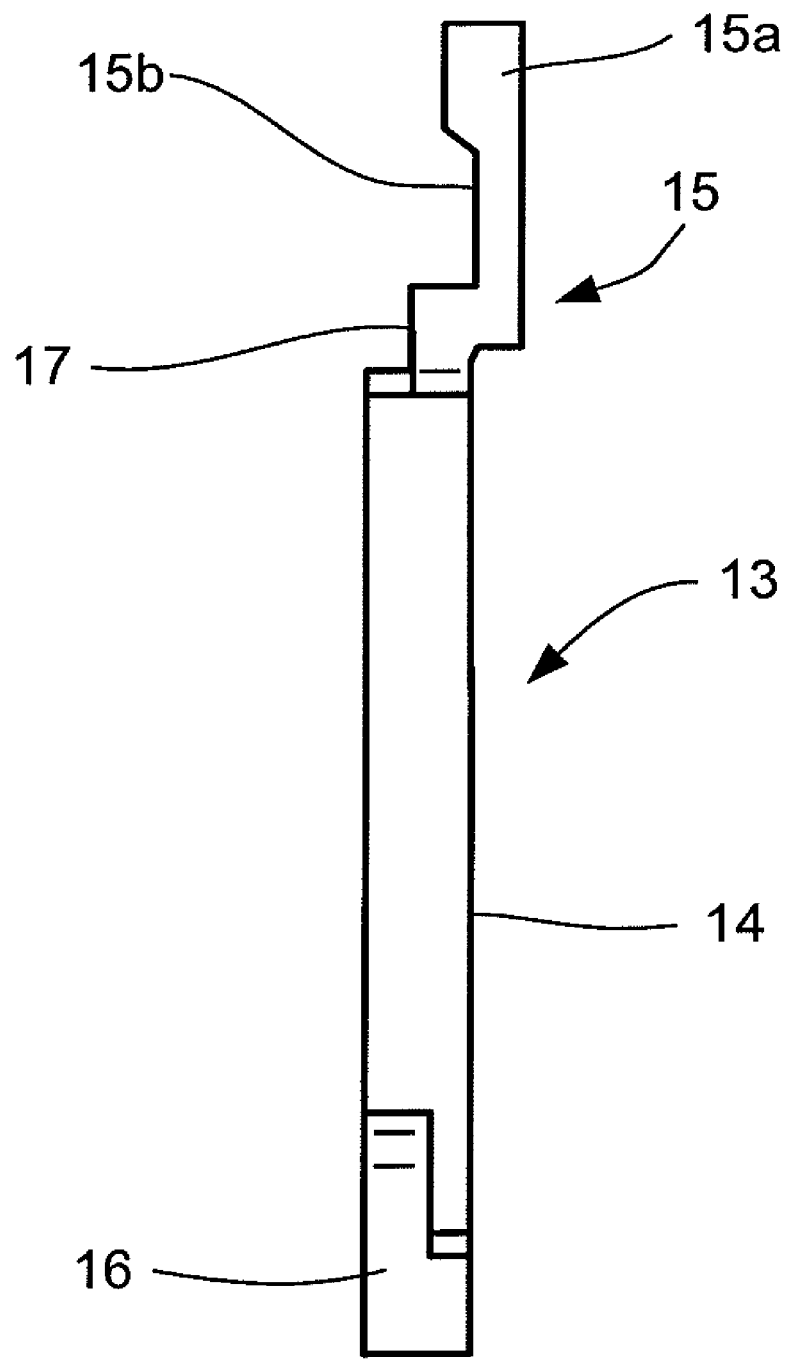
FIG. 7 is an elevational view of the scraping member as viewed in a direction of an arrow 7 in FIG. 6 in accordance with the first embodiment of the present invention.
Figure 8:
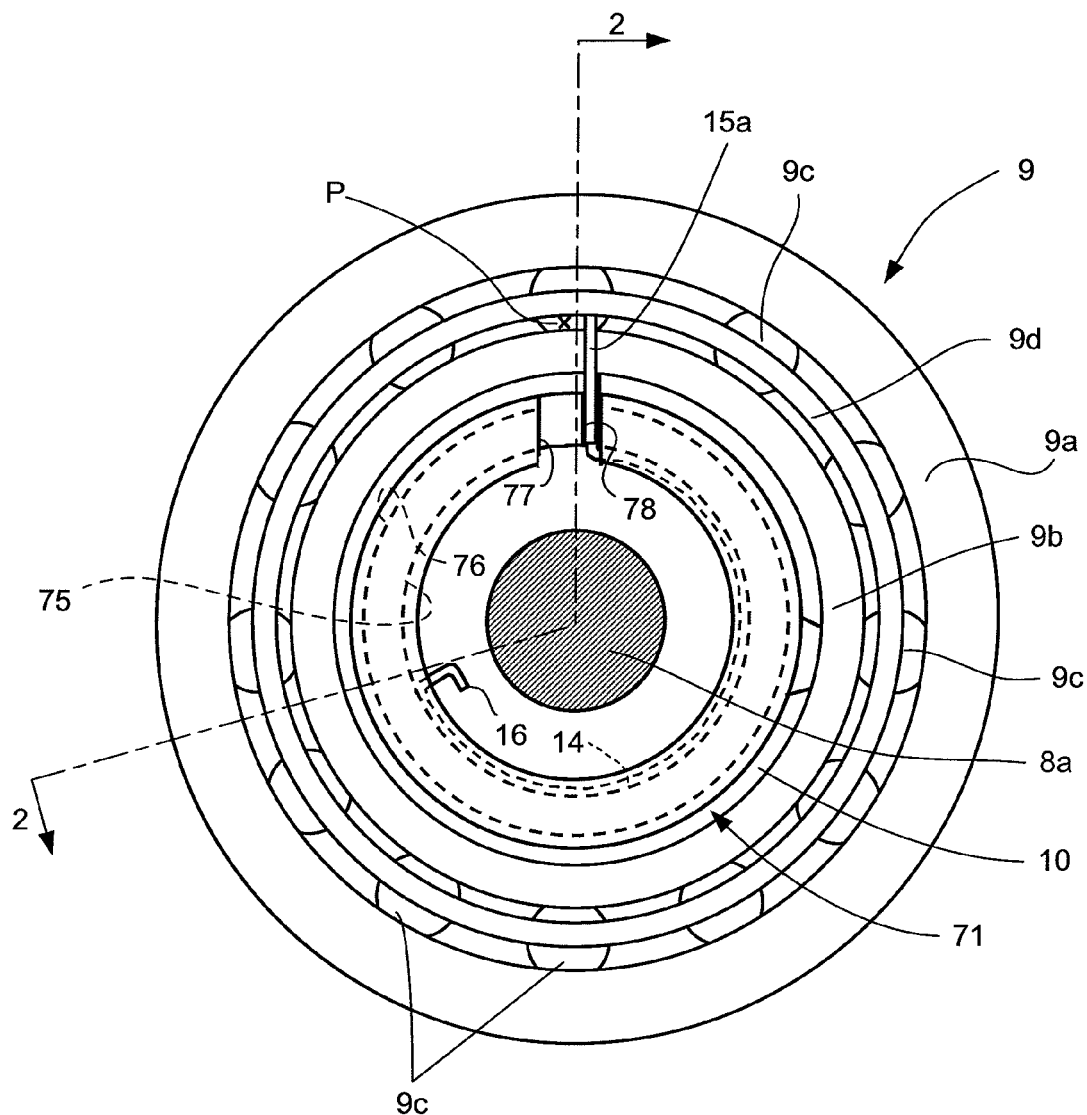
FIG. 8 is a cross sectional view of the transmission taken along a section line 8-8 in FIG. 2 (with selected parts removed for purpose of illustration) in accordance with the first embodiment of the present invention.

In the lubricating system of the first embodiment, a scraping member 13 is provided that fits into the radial notch part 78, as shown in FIGS. 6 and 7. FIG. 6 is an axial end elevational view of the scraping member 13 of the lubricating system. FIG. 7 is an elevational view of the scraping member 13 as viewed in a direction of an arrow 7 in FIG. 6. FIG. 8 is a cross sectional view of the transmission 1 taken along a section line 8-8 in FIG. 2 with selected parts removed for purpose of illustration.

The scraping member 13 includes a generally C-shaped leaf-spring part 14, a fin part 15, a protruding strip portion 16, an engagement strip portion 17. The C-shaped leaf-spring part 14 has elastic characteristics. The engagement strip portion 17 is formed to protrude outwardly in the radial direction toward a first open end portion of the leaf-spring part 14. The fin part 15 includes an extending strip part 15a that extends in the radial direction. The extending strip part 15a is integrally formed with the engagement strip portion 17 and extends further outwardly in the radial direction from the engagement strip portion 17. As shown in FIG. 7, a notch 15b is formed on the extending strip part 15a on the side facing the bearing 9 in order to bypass the snap ring 10 as shown in FIG. 2. In the first embodiment, the C-shaped leaf-spring part 14 and the engagement strip portion 17 preferably constitutes a fixing part of the present invention.

The protruding strip portion 16 is integrally formed on a second open end portion of the leaf-spring part 14 as shown in FIGS. 6 and 7. The protruding strip portion 16 is bent toward a center of the leaf-spring part 14. Moreover, the protruding strip portion 16 further includes a bent strip portion 16a (claw) formed on the inner end of the protruding strip portion 16. The bent strip portion 16a is bent at about 90° toward the leaf-spring part 14 as shown in FIG. 6.

The C-shaped leaf-spring part 14 of the scraping member 13 is configured and arranged to elastically fit within the annular groove 75 of the driven transmission gear 7. Moreover, the engagement strip portion 17 of the scraping member 13 is inserted within the radial notch part 78 of the driven transmission gear 7 as shown in FIGS. 2 and 7, and thus, the scraping member 13 is prevented from turning relative to the driven transmission gear 7. As shown in FIGS. 2 and 8, the extending strip part 15a extends radially outward from the radial groove 77 so that a free end of the extending strip part 15a is positioned further outwardly in the radial direction than the inner race 9b. As shown in FIG. 2, the radial groove 77 extends along the fin part 15 so that the lubricating oil scraped by the fin part 15 can be efficiently guided to the lip portion 12a.

With this arrangement, when the lubricating oil is supplied to the bearing 9, the lubricating oil passes between the outer race 9a and the inner race 9b as lubricating the bearing 9. Then, the lubricating oil is discharged from a lubricating oil discharging part P (FIG. 2) on the axial end surface of the bearing 9. The discharged lubricating oil is then scraped within the radial groove 77 by the distal end of the extending strip part 15a of the scraping member 13 that is attached to the axial end portion of the boss part 71 of the driven transmission gear 7.

The rotation of the fin part 15 (the extending strip part 15a) properly guides the lubricating oil, which was discharged from the discharging part P, within the radial groove 77. The lubricating oil passes through the radial groove 77 and flows toward the radial inner side of the driven transmission gear 7. The lubricating oil is then supplied to the lip portion 12a of the oil-seal member 12, allowing a space (a contacting portion) between the lip portion 12a and the sliding surface 82 to be properly lubricated. In other words, the lubricating oil scraped by the extending strip part 15a passes through the radial groove 77 and then properly guided toward the lip portion 12a.

Moreover, when the scraping member 13 is attached to the driven transmission gear 7, the protruding strip portion 16 extends toward a center portion of the driven transmission gear 7. Therefore, the lubricating oil that might adhere to the inner circumferential surface of the annular groove 75 of the driven transmission gear 7 due to the centrifugal force of rotation can be properly guided toward the lip portion 12a by the protruding strip portion 16.

Therefore, the lubricating oil is prevented from adhering by the protruding strip portion 16, and the lubricating oil can be properly supplied to the lip portion 12a. In the first embodiment of the present invention, the leaf-spring part 14 is fitted within the annular groove 75 formed in the boss part 71 of the driven transmission gear 7, the fin part 15 protrudes outwardly in the radial direction from the radial groove 77, and the scraping member 13 can be easily attached to the boss part 71 of the driven transmission gear 7. The lubricating oil discharged from the bearing 9 is properly scraped by the extending strip part 15a and guided radially inwardly through the radial groove 77. The lubricating oil is prevented from adhering to the annular groove 75 by providing the protruding strip portion 16, and the lubricating oil can be further reliably supplied to the lip portion 12a of the oil-seal member 12. Moreover, the protruding strip portion 16 can also be used as a knob for detaching the scraping member 13 from the annular groove 75 of the boss part 71 during disassembly for maintenance or other purposes, thereby improving workability.

In the first embodiment described above, the radial notch part 78 is formed in a part of the radial groove 77, which is formed in the axial end surface 74 of the boss part 71 of the driven transmission gear 7. The scraping member 13 is attached to the boss part 71 in a state in which the engagement strip portion 17 is fitted within the radial notch part 78 so that a free end portion of the extending strip part 15a of the fin part 15 is positioned further outwardly in the radial direction than the inner race 9b of the bearing 9. The lubricating oil that lubricated the bearing 9 and discharged at the lubricating oil discharging part P is therefore scraped by the fin part 15 along with the rotation of the driven transmission gear 7. The lubricating oil passes through the radial groove 77 and is guided toward the lip portion 12a of the oil-seal member 12.

In other words, the lubricating oil can be supplied to the lip portion 12a even if an oil gutter, oil receiver, or other so-called trough member is not used. As a result, the lubricity of the lip portion 12a of the oil-seal member 12 can be ensured without the size of the motive force transmitting apparatus being increased. The lubricating oil can be scraped by the scraping member 13, and can be efficiently supplied to the lip portion 12a after the bearing 9 has been lubricated even if the amount of lubricating oil used is relatively small.

Moreover, the fin part 15 for scraping the lubricating oil is relatively easily fixed to the boss part 71 with the scraping member 13 having the structure as illustrated above.

Furthermore, the C-shaped leaf-spring part 14 of the scraping member 13 is fitted into the annular groove 75 formed in the inner circumferential surface of the boss part 71. Therefore, displacement of the fin part 15 in the radial direction with respect to the rotating shaft (e.g., an input shaft 8a) can be prevented.

Also, the scraping member 13 includes the protruding strip portion 16 that protrudes inwardly in the radial direction on the second open end portion of the C-shaped leaf-spring part 14. Therefore, the lubricating oil guided inwardly in the radial direction via the radial groove 77 is prevented from adhering to the inner circumferential surface of the boss part 71 due to the centrifugal force resulting from the rotation of the driven transmission gear 7.

Second Embodiment

Figure 9:
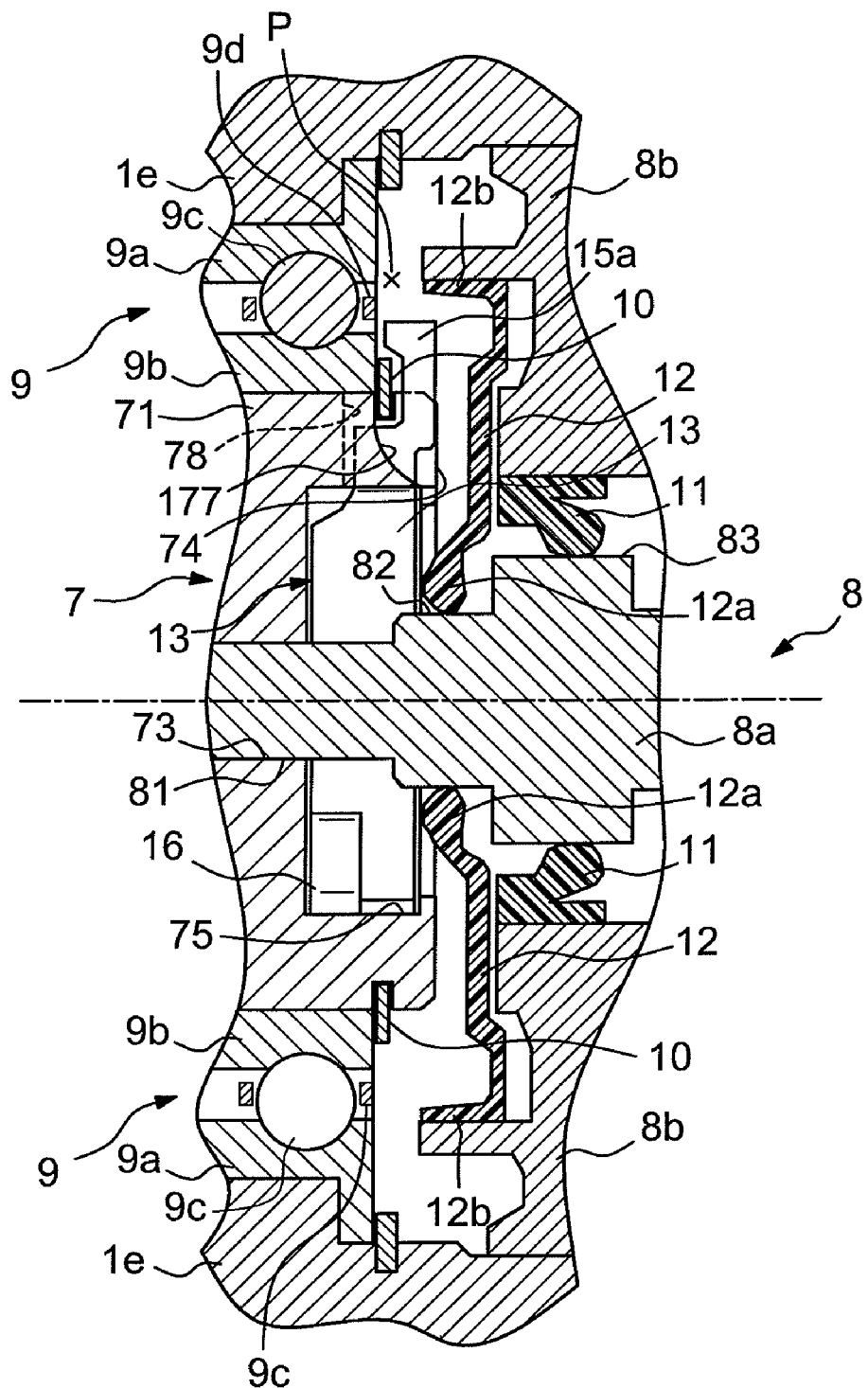
FIG. 9 is an enlarged cross sectional view of a transmission provided with a lubricating system at an area of an input shaft of a transfer device in accordance with a second embodiment of the present invention.
Figure 10:
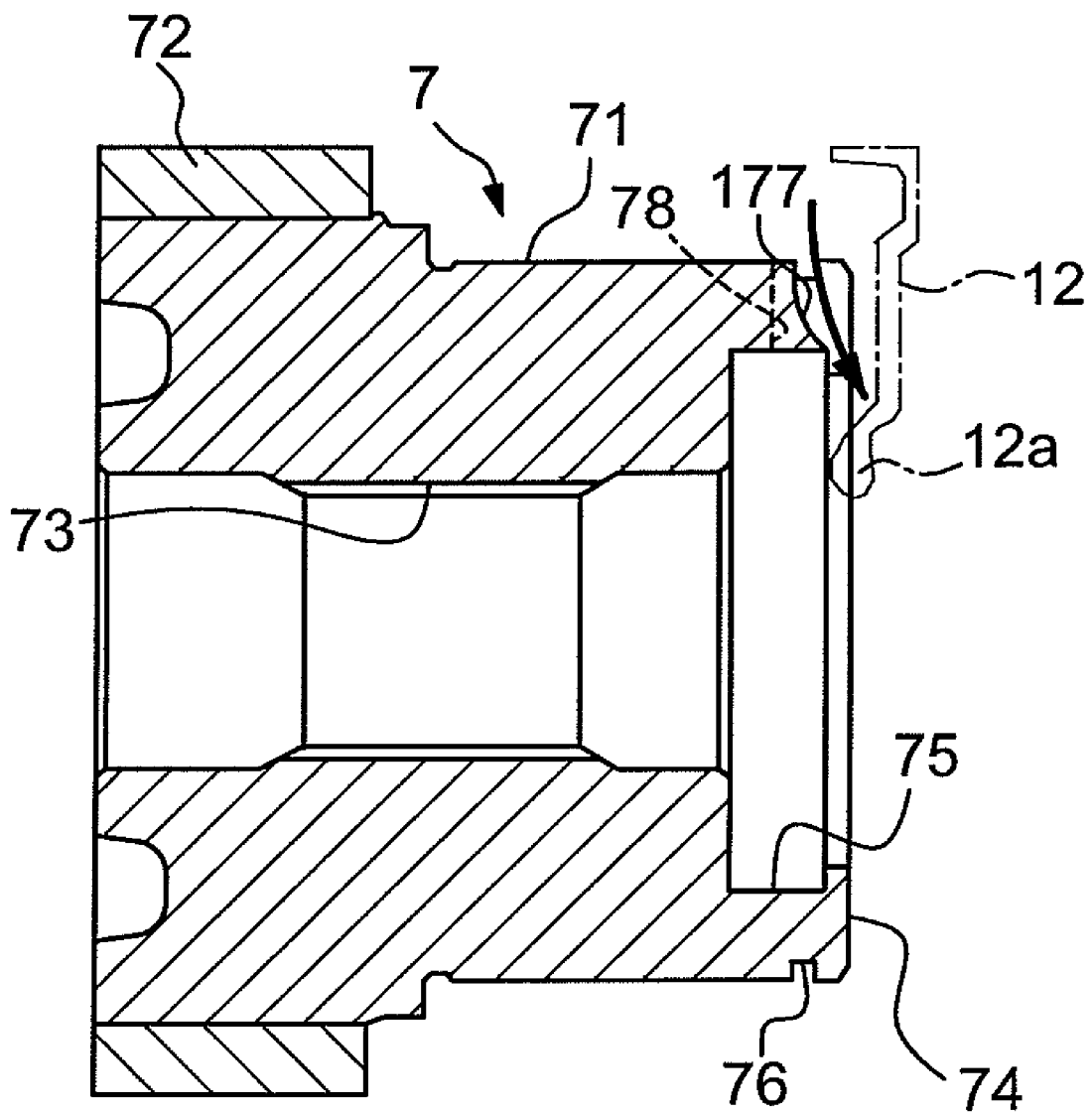
FIG. 10 is an enlarged axial cross sectional view of a driven transmission gear of the transmission in accordance with the second embodiment of the present invention.

Referring now to FIGS. 9 and 10, a lubricating system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The lubricating system of the second embodiment is basically identical to the lubricating system of the first embodiment except for a shape of a radial groove 177 formed on the driven transmission gear 7.

FIG. 9 is an enlarged cross sectional view, corresponding FIG. 2 of the first embodiment, of the transmission provided with the lubricating system at an area of the input shaft 8a of the transfer device 8 in accordance with the second embodiment. FIG. 10 is an enlarged axial cross sectional view of the driven transmission gear 7 of the transmission in accordance with the second embodiment.

Similarly to the first embodiment, in the second embodiment, the radial groove 177 (guiding section) is formed on the boss part 71 of the driven transmission gear 7 adjacent to the axial end surface 74. In the second embodiment, a bottom surface of the radial groove 177 is slanted so that a radial inner end portion of the radial groove 177 is shallower than a radial outer end portion of the radial groove as shown in FIGS. 9 and 10.

In other words, the radial groove 177 is slanted toward the oil-seal member 12 in the radially inward direction as seen in FIGS. 9 and 10. The lubricating oil that is guided within the radial groove 177 by the extending strip part 15a of the scraping member 13 is directed along the slanted bottom surface of the radial groove 177 in the axial direction as shown with an arrow in FIG. 10. With this arrangement, the lubricating oil can be reliably supplied to the lip portion 12a of the oil-seal member 12.

In the second embodiment, the bottom surface of the radial groove 177 is slanted so that the radial inner end portion of the radial groove 177 is shallower than the radial outer end portion of the radial groove 177. Therefore, the lubricating oil scraped by the fin part 15 can be efficiently guided to the lip portion 12a even when the lip portion 12a is positioned toward the rear side in the axial direction (left side in FIG. 2) with respect to the bearing 9.

Third Embodiment

Referring now to FIGS. 11 to 14, a lubricating system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The lubricating system of the third embodiment differs from the lubricating system of the first embodiment in that a scraping member 213 is used in the third embodiment instead of the scraping member 13 of the first embodiment.

Figure 11:
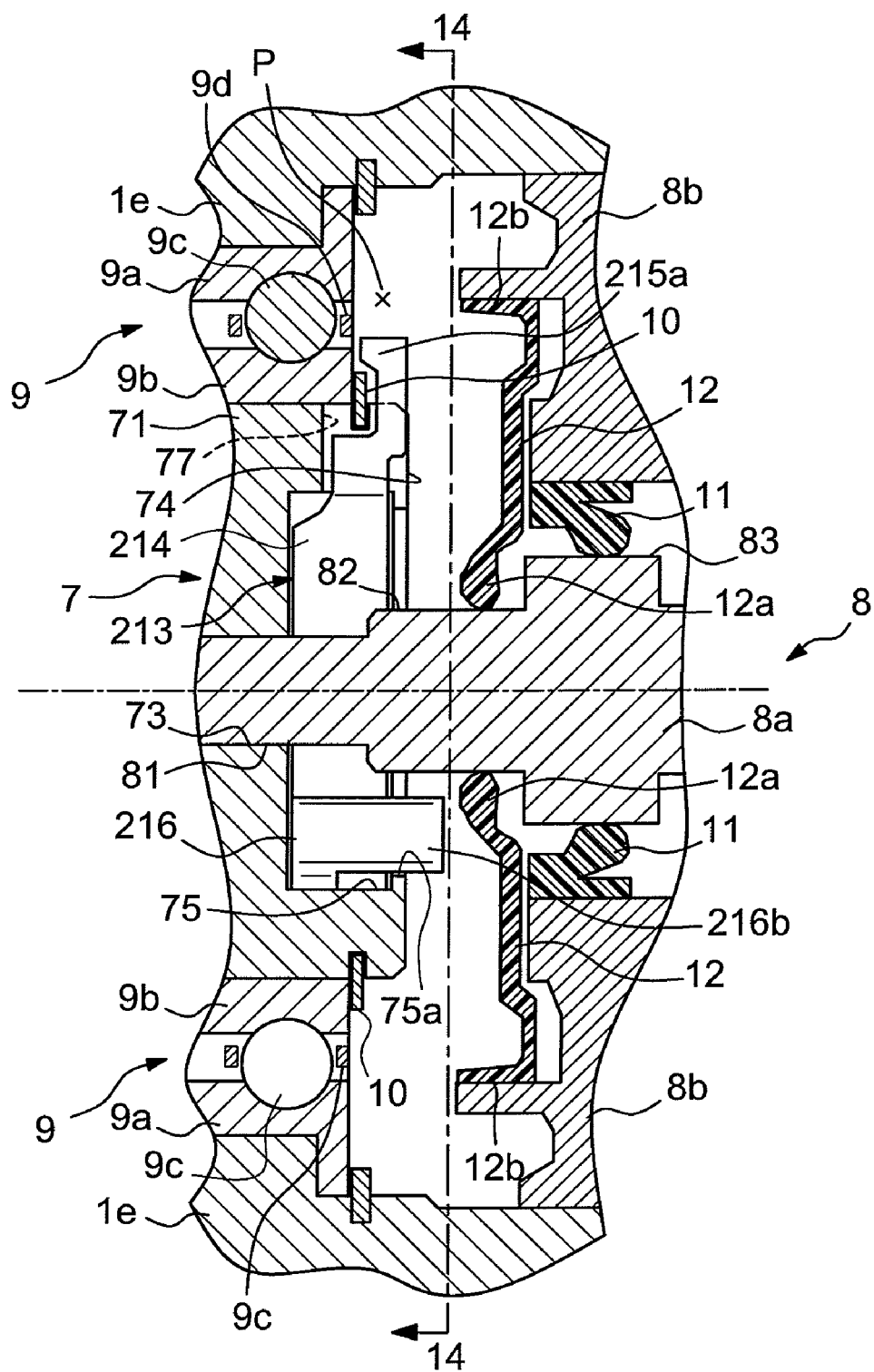
FIG. 11 is an enlarged cross sectional view of a transmission provided with a lubricating system at an area of an input shaft of a transfer device taken along a section line 11-11 in FIG. 14 in accordance with a third embodiment of the present invention.
Figure 12:
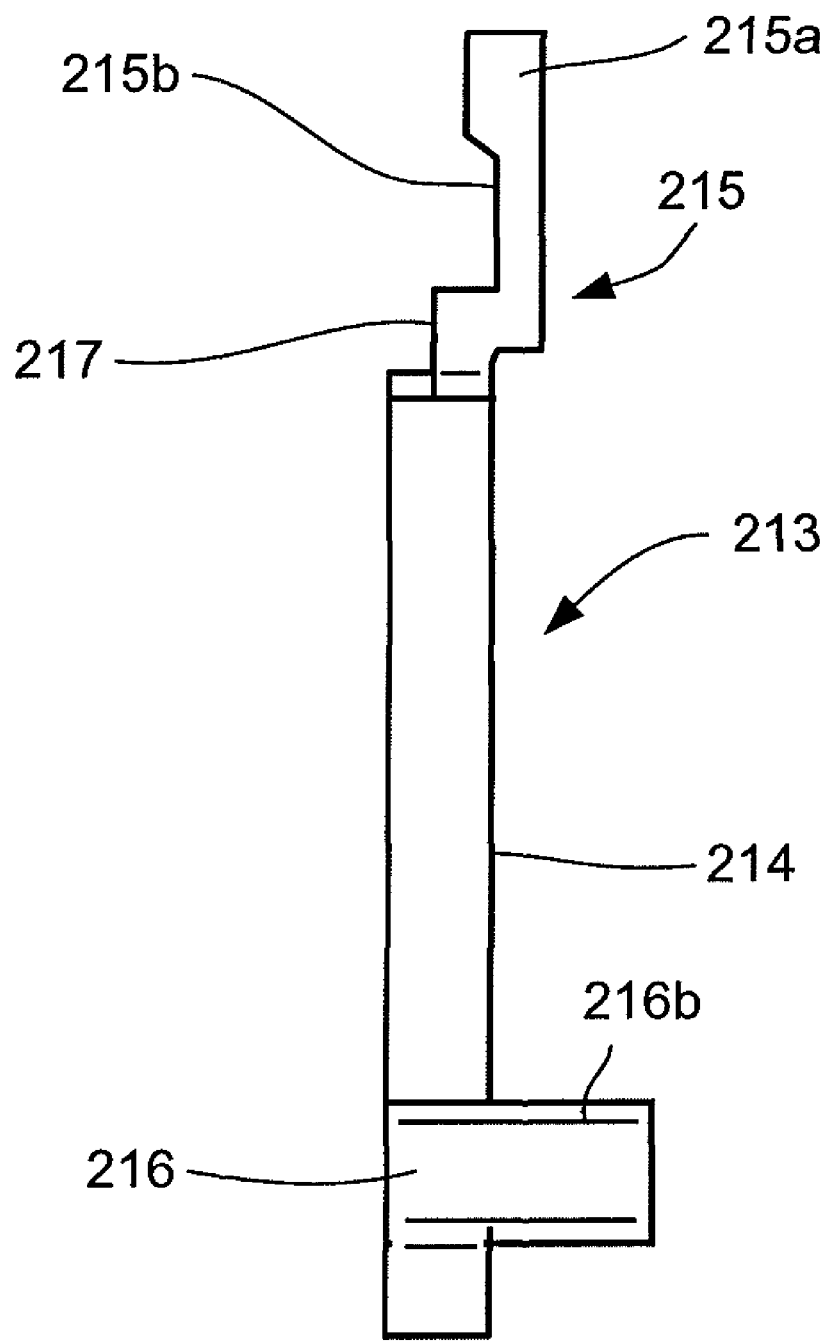
FIG. 12 is an elevational view of a scraping member of the lubricating system in accordance with the third embodiment of the present invention.
Figure 13:
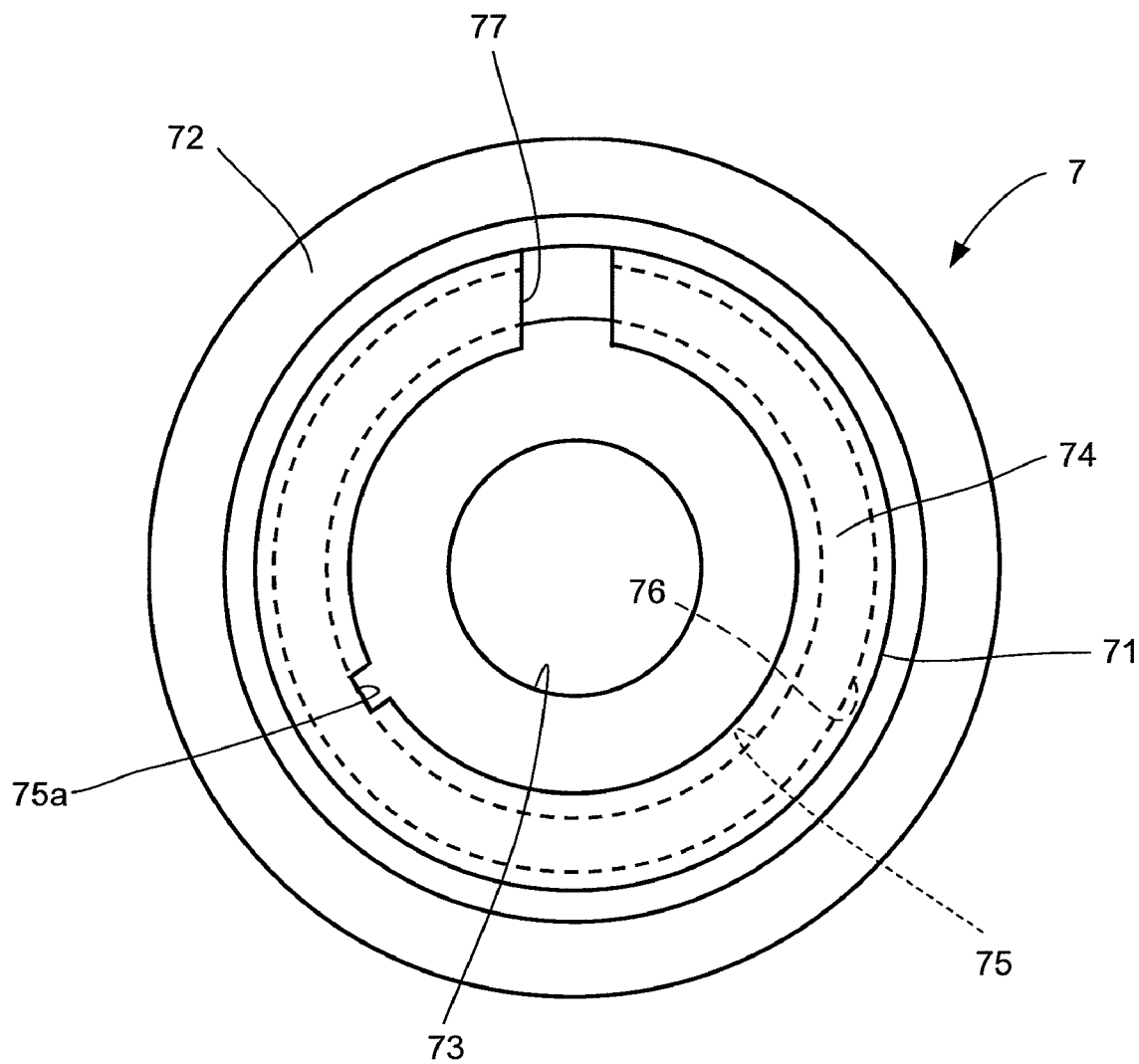
FIG. 13 is an axial end elevational view of a driven transmission gear of the transmission in accordance with the third embodiment of the present invention.
Figure 14:
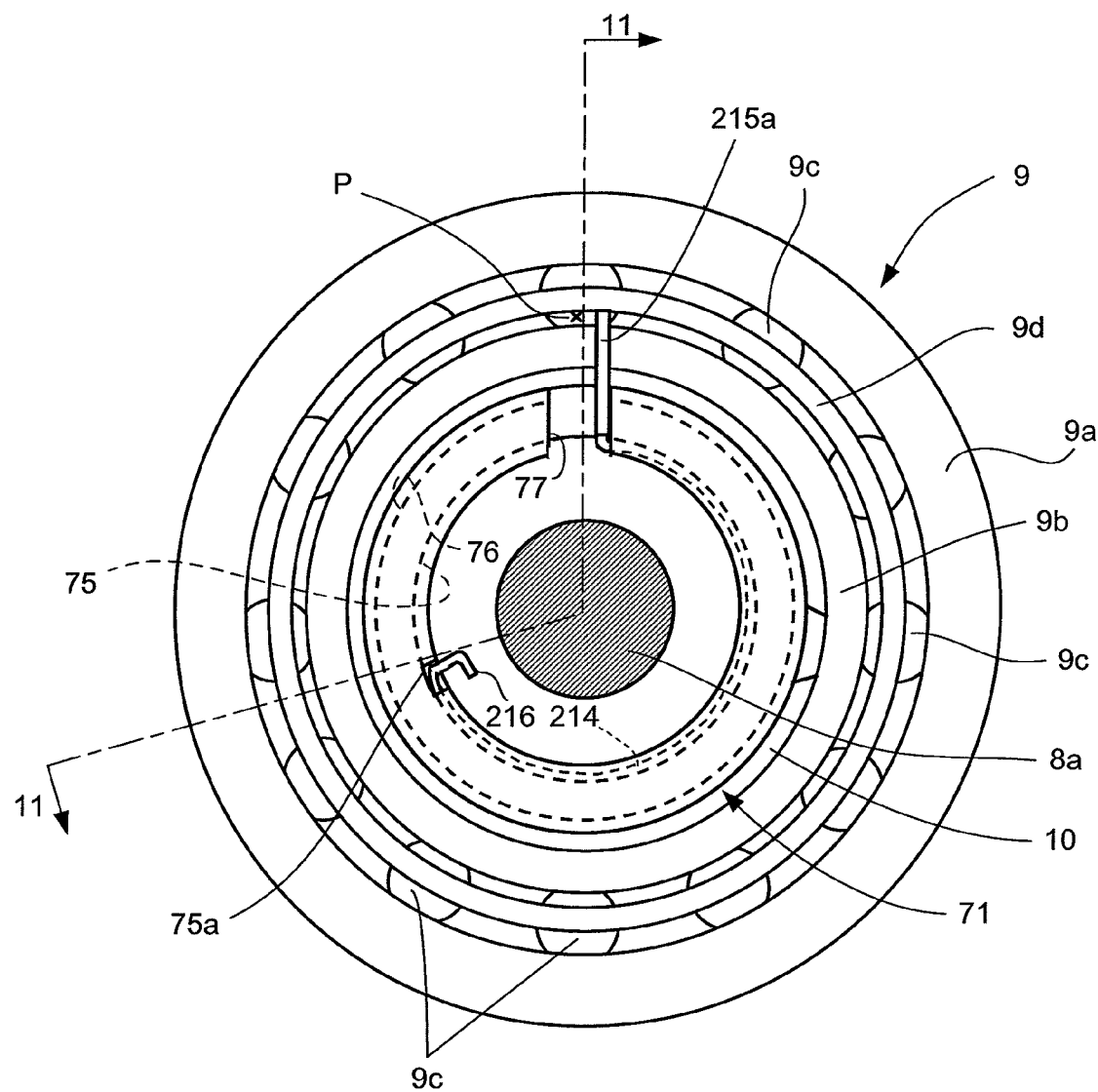
FIG. 14 is a cross sectional view of the transmission taken along a section line 14-14 in FIG. 11 (with selected parts removed for purpose of illustration) in accordance with the third embodiment of the present invention.

FIG. 11 is an enlarged cross sectional view of a transmission provided with the lubricating system at an area of the input shaft 8a of the transfer device 8 taken along a section line 11-11 in FIG. 14. FIG. 12 is an elevational view of the scraping member 213 in accordance with the third embodiment. FIG. 13 is an axial end elevational view of the driven transmission gear 7 in accordance with the third embodiment. FIG. 14 is a cross sectional view of the transmission taken along a section line 14-14 in FIG. 11 in accordance with the third embodiment with selected parts removed for the purpose of illustration.

In the third embodiment, the scraping member 213 includes an axially-extending part 216b is that is integrally formed on a protruding strip portion 216. The axially-extending part 216b is oriented in the axial direction. In other words, the axially-extending part 216b extends toward the lip portion 12a of the oil-seal member 12 when the scraping member 213 is attached to the driven transmission gear 7.

Moreover, as shown in FIG. 13, the driven transmission gear 7 in the third embodiment includes a notch part 75a formed extending between the annular groove 75 and the axial end surface 74 of the boss part 71 in order to accommodate the axially-extending part 216b of the scraping member 213. Thus, when the scraping member 213 is assembled with the driven transmission gear 7, the axially-extending part 216b protrudes in the axial direction from the notch part 75a toward the lip portion 12a of the oil-seal member 12 as shown in FIGS. 11 and 14.

More specifically, the axially-extending part 216b of the scraping member 213 can be fitted and attached within the notch part 75a, as shown in FIG. 14. The scraping member 213 is securely attached within the annular groove 75 of the boss part 71 and prevented from rotating since the axially-extending part 216b is inserted within the notch part 75a.

The axially-extending part 216b is fitted into the notch part 75a in the assembled state, whereby rotation of the scraping member 213 is prevented. Therefore, the radial notch part 78 for preventing the rotation of the scraping member 13 in the first embodiment is not necessary in the third embodiment. Thus, only the radial groove 77 is formed in the axial end surface 74 of the boss part 71 of the driven transmission gear 7 so that the lubricating oil to be guided toward the annular groove 75.

As shown in FIG. 12, the scraping member 213 of the third embodiment includes a leaf-spring part 214, a fin part 215, the protruding strip portion 216 and an engagement strip portion 217. The structures of the leaf-spring part 214, the fin part 215 and the engagement strip portion 217 are basically identical to the leaf-spring part 14, the fin part 15 and the engagement strip portion 17 of the scarping member 13 in the first embodiment. As in the first embodiment, the scraping member 213 is tightly fixed to the annular groove 75 by the elasticity of the leaf-spring part 214 of the scraping member 213, and an extending strip part 215a of the scraping member 213 protrudes outwardly in the radial direction along the radial groove 77 in the third embodiment. The scraping member 213 rotates integrally with the driven transmission gear 7. Therefore, the lubricating oil discharged from the lubricating oil discharging part P on the axial end surface of the bearing 9 is scraped by the extending strip part 215a and properly guided within the radial groove 77. The lubricating oil is also prevented from adhering to the annular groove 75 by the protruding strip portion 216. The lubricating oil is properly supplied to the lip portion 12a of the oil-seal member 12 along the axially-extending part 216b that extends in the axial direction. The lubricating oil can be more reliably supplied to the lip portion 12a even if the amount of lubricating oil is relatively small.

In the third embodiment, the protruding strip portion 216 includes the axially-extending part 216b that is oriented toward the lip portion 12a. Therefore, the lubricating oil is further prevented from adhering to the inner circumferential surface of the boss part 71 due to the centrifugal force resulting from the rotation of the driven transmission gear 7, and the non-adhering lubricating oil can be efficiently guided to the lip portion 12a.

Fourth Embodiment

Figure 15:
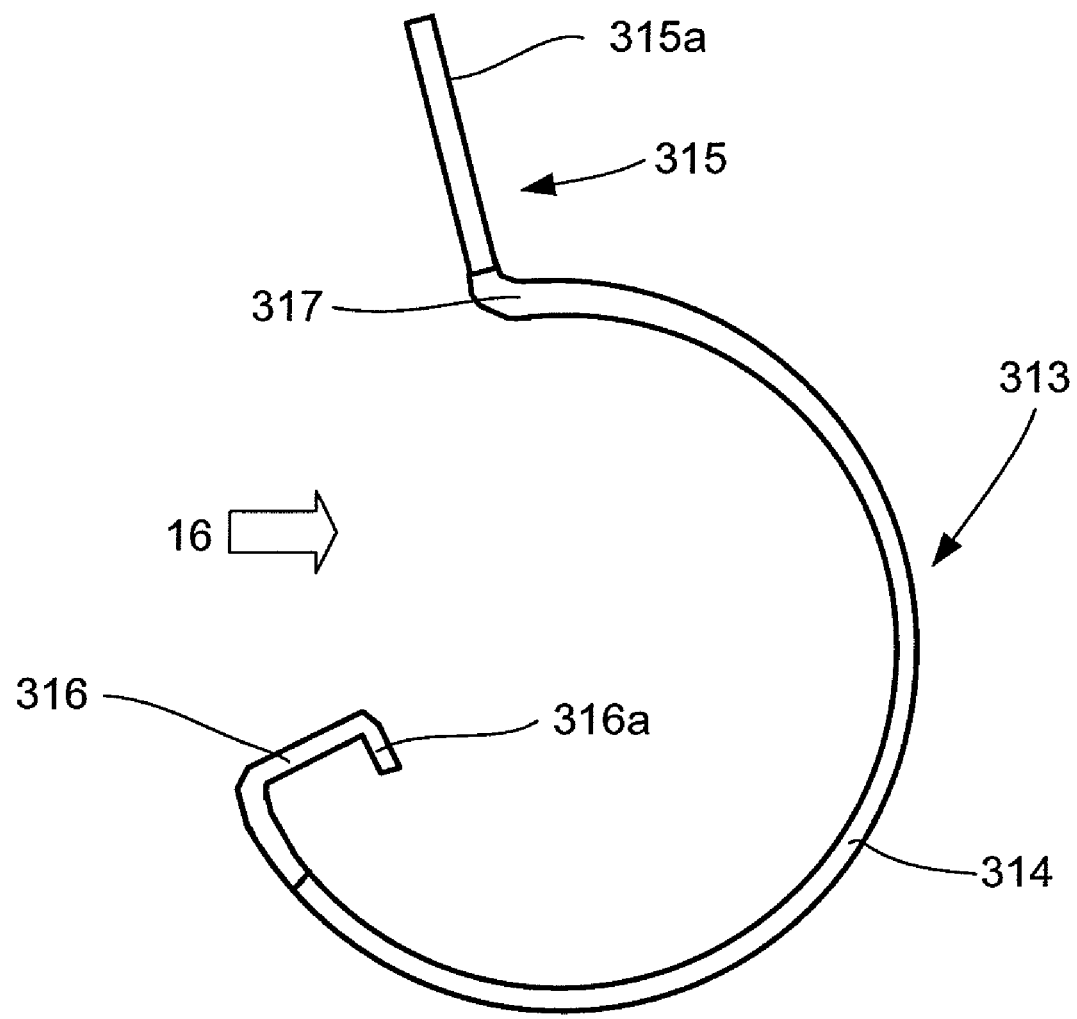
FIG. 15 is an axial end elevational view of a scraping member of a lubricating system in accordance with a fourth embodiment of the present invention.
Figure 16:
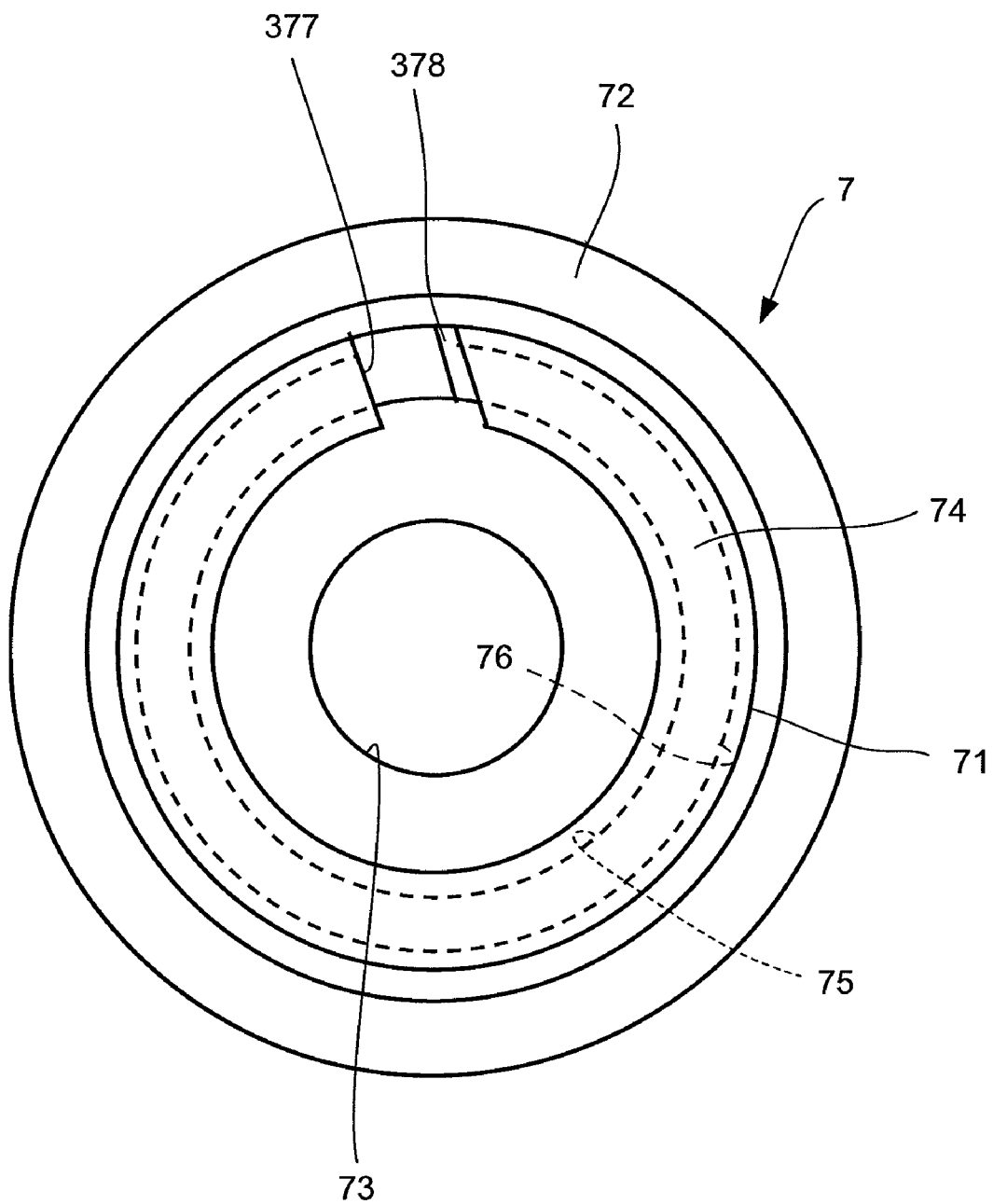
FIG. 16 is a side elevational view of a driven transmission gear of a transmission in accordance with the fourth embodiment of the present invention.

Referring now to FIGS. 15 to 17, a lubricating system in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

FIG. 15 is an axial end elevational view of a scraping member 313 in accordance with the fourth embodiment. FIG. 16 is an axial end elevational view of the driven transmission gear 7 in accordance with the fourth embodiment. FIG. 17 is a cross sectional view, similar to FIG. 8 in the first embodiment, of the transmission in accordance with the fourth embodiment.

The lubricating system of the fourth embodiment differs from the lubricating system of the first embodiment in that, in the fourth embodiment, the scraping member 313 includes an extending strip part 315a and an engagement strip portion 317 formed on a first open end portion of a C-shaped leaf-spring part 314, which are slanted with respect to the radial direction in a rotation direction of the driven transmission gear 7 as shown in FIG. 17. In other words, the extending strip part 351a (the fin part 351) is slanted such that a distal end portion of the extending strip part 351a is oriented toward the rotation direction of the driven transmission gear 7 with respect to a base end portion of the extending strip part 351a where it connects to the engagement strip portion 317. The scraping member 313 further includes a protruding strip portion 316 is integrally formed on a second open end portion of the leaf-spring part 314. The structures of the leaf-spring part 314 and the protruding strip portion 316 of the scraping member 313 are basically the same as the structures of the leaf-spring part 14 and the protruding strip portion 16 of the scraping member 13 in the first embodiment.

In the fourth embodiment, the driven transmission gear 7 includes a radial groove 377 (guiding section) that extends through the annular groove 75 formed on the boss part 71 of the driven transmission gear 7 adjacent to the axial end surface 74. The radial groove 377 is slanted with respect to the radial direction of the driven transmission gear 7 in the rotation direction in order to receive the extending strip part 351a of the scraping member 313. Moreover, a deep radial notch part 378 is further indented in the axial direction from the bottom surface of the radial groove 377 and the radial notch part 378 is also slanted in the rotation direction as shown in FIG. 16. As shown in FIG. 17, the engagement strip portion 317 of the scraping member 313 is fitted within the radial notch part 378 so that the scraping member 313 is prevented from rotating with respect to the driven transmission gear 7. Thus, the scraping member 313 can be fitted and secured within the annular groove 75 of the driven transmission gear 7.

As shown in FIG. 17, when the driven transmission gear 7 rotates in the rotation direction shown by an arrow with the scraping member 313 in an assembled state, the lubricating oil discharged from the lubricating oil discharging part P on the axial end surface of the bearing 9 is scraped within the radial groove 377 by the extending strip part 315a that extends slantwise in the rotation direction. Since the radial groove 377 and the extending strip part 315a are slanted in the rotation direction, the lubricating oil can be efficiently introduced into the annular groove 75. Moreover, similarly to the first embodiment, the protruding strip portion 316 prevents the lubricating oil from adhering to the annular groove 75, and the lubricating oil can be reliably supplied to the lip portion 12a of the oil-seal member 12.

Fifth Embodiment

Referring now to FIGS. 18 to 23, a lubricating system in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

Figure 21:
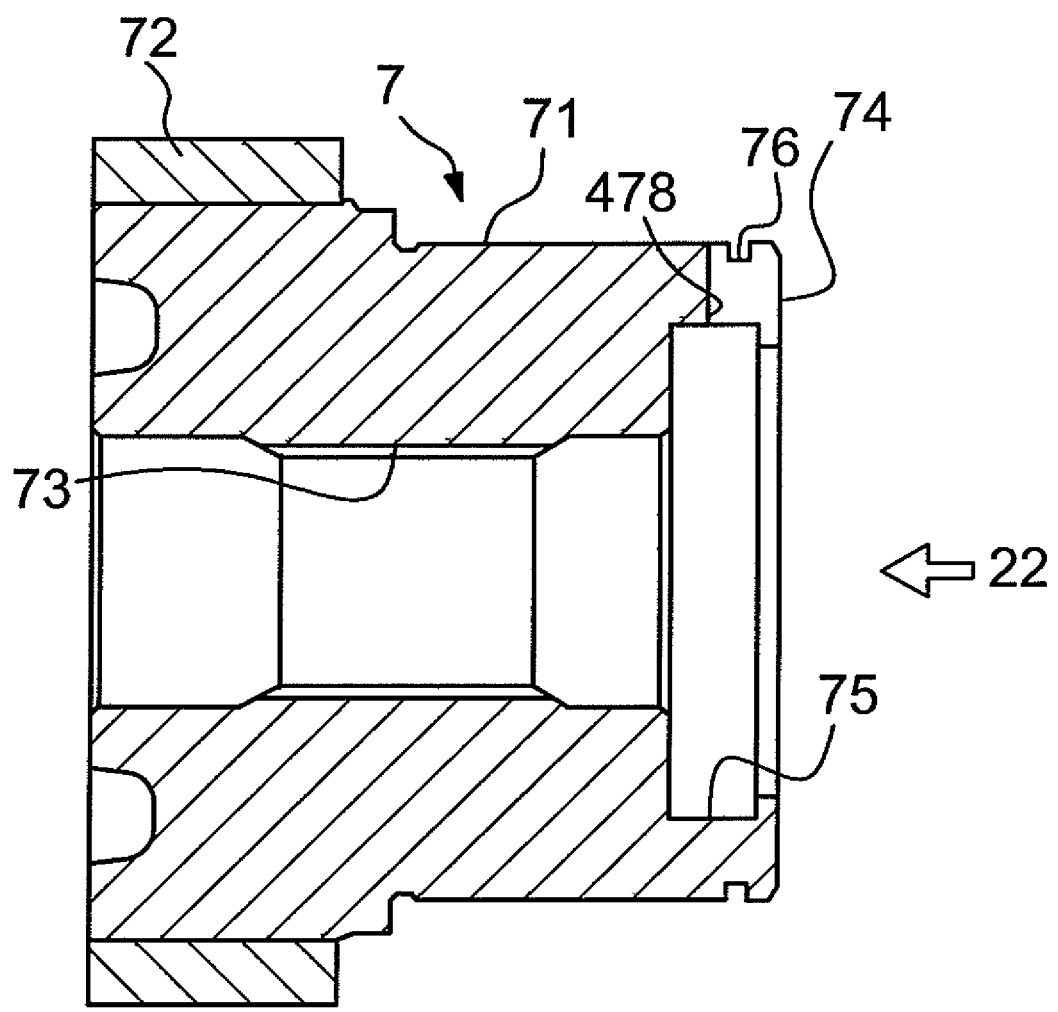
FIG. 21 is an enlarged axial cross sectional view of a driven transmission gear of the transmission in accordance with the fifth embodiment of the present invention.
Figure 22:
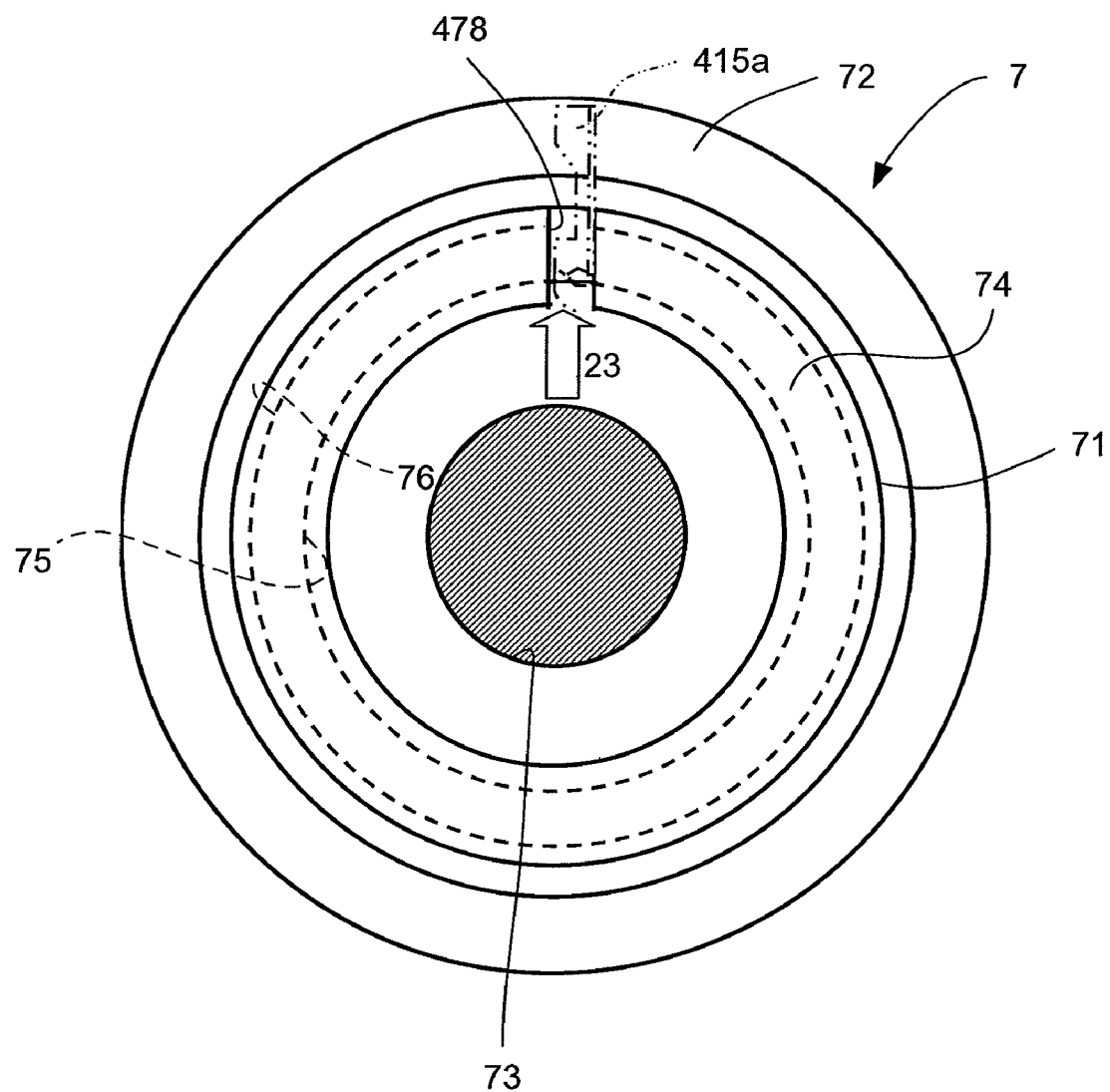
FIG. 22 is an axial end elevational view of the driven transmission gear as viewed in a direction of an arrow 22 in FIG. 21 in accordance with the fifth embodiment of the present invention.

FIG. 18 is an axial end elevational view of a scraping member 413 of the lubricating system in accordance with the fifth embodiment. FIG. 19 is a top plan view of the scraping member 413 as viewed in a direction of an arrow 19 in FIG. 18. FIG. 20 is an enlarged cross sectional view, corresponding to FIG. 2 of the first embodiment, of the transmission at an area of the input shaft 8a of the transfer device 8 in accordance with the fifth embodiment. FIG. 21 is an enlarged axial cross sectional view of the driven transmission gear 7 in accordance with the fifth embodiment. FIG. 22 is an axial end elevational view of the driven transmission gear 7 as viewed in a direction of an arrow 22 in FIG. 21 in accordance with the fifth embodiment. FIG. 23 is an enlarged partial structural diagram of the driven transmission gear 7 as viewed in a direction of an arrow 23 in FIG. 22.

The lubricating system of the fifth embodiment differs from the lubricating system of the first embodiment in that an extending strip part 415a that constitutes a fin part 415 protruding from a leaf-spring part 414 of the scraping member 413 is slanted with respect to the axial end surface 74 of the driven transmission gear 7. In other words, the extending strip part 415a of the scraping member 413 includes a scraping surface 415a' that faces toward the lip portion 12a when the scraping member 413 is attached to the driven transmission gear 7. The scraping surface 415a' is configured and arranged to scrape the lubricating oil. With such arrangement, the lubricating oil discharged from the axial end surface of the bearing 9 is guided in the axial direction, i.e., toward the lip portion 12a of the oil-seal member 12, at the same time as the lubricating oil is scraped away by rotation.

Since the extending strip part 415a is slanted so that the scraping surface 415a' faces toward the lip portion 12a, the driven transmission gear 7 includes a radial notch part 478 (guiding section) that is deeply indented in the axial direction formed on the outer circumferential surface of the annular groove 75 of the boss part 71 so that the extending strip part 415a is fitted within the radial notch part 478 as shown in FIG. 23. The scraping member 413 is fitted and attached within the radial notch part 478. In the fifth embodiment, a groove that corresponds to the radial groove 77 of the first embodiment is not provided in the driven transmission gear 7. The extending strip part 415a of the scraping member 413 is held in position and the scraping member 413 is prevented from rotating with respect to the driven transmission gear 7 since the extending strip part 415a is fitted within the radial notch part 478 of the boss part 71.

As in the first embodiment, the leaf-spring part 414 of the scraping member 413 of the fifth embodiment is elastically fixed within the annular groove 75 of the boss part 71. The protruding strip portion 416 is formed on the opposite side from the extending strip part 415a of the scraping member 13, as in the first embodiment. The structures of the leaf-spring part 414 and the protruding strip portion 416 of the scraping member 413 are basically identical to the structures of the leaf-spring part 14 and the protruding strip portion 16 of the scraping member 13 in the first embodiment.

The scraping surface 415a' of the extending strip part 415a faces in the direction of the lip portion 12a and is configured and arranged to scrape the lubricating oil when the driven transmission gear 7 rotates in the state in which the scraping member 413 is non-rotatably (with respect to the driven transmission gear 7) assembled in the annular groove 75 of the boss part 71. Therefore, the lubricating oil discharged from the axial end surface of the bearing 9 is scraped away by the extending strip part 415a, the scraped lubricating oil flows in the axial direction, i.e., toward the lip portion 12a of the oil-seal member 12, and the lubricating oil can be properly supplied to the lip portion 12a.

Sixth Embodiment

Referring now to FIGS. 24 to 28, a lubricating system in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

Figure 24:
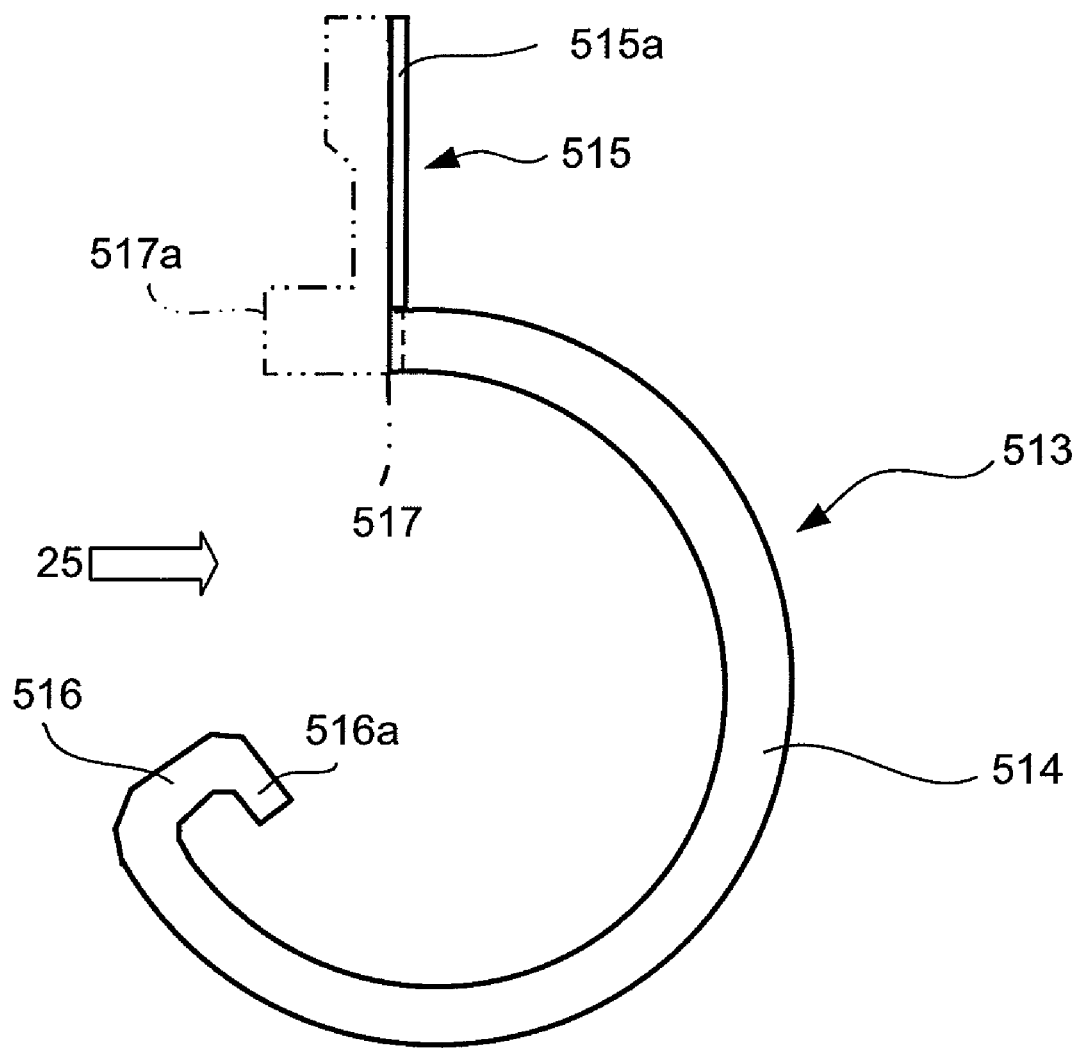
FIG. 24 is an axial end elevational view of a scraping member of a lubricating system in accordance with a sixth embodiment of the present invention.
Figure 26:
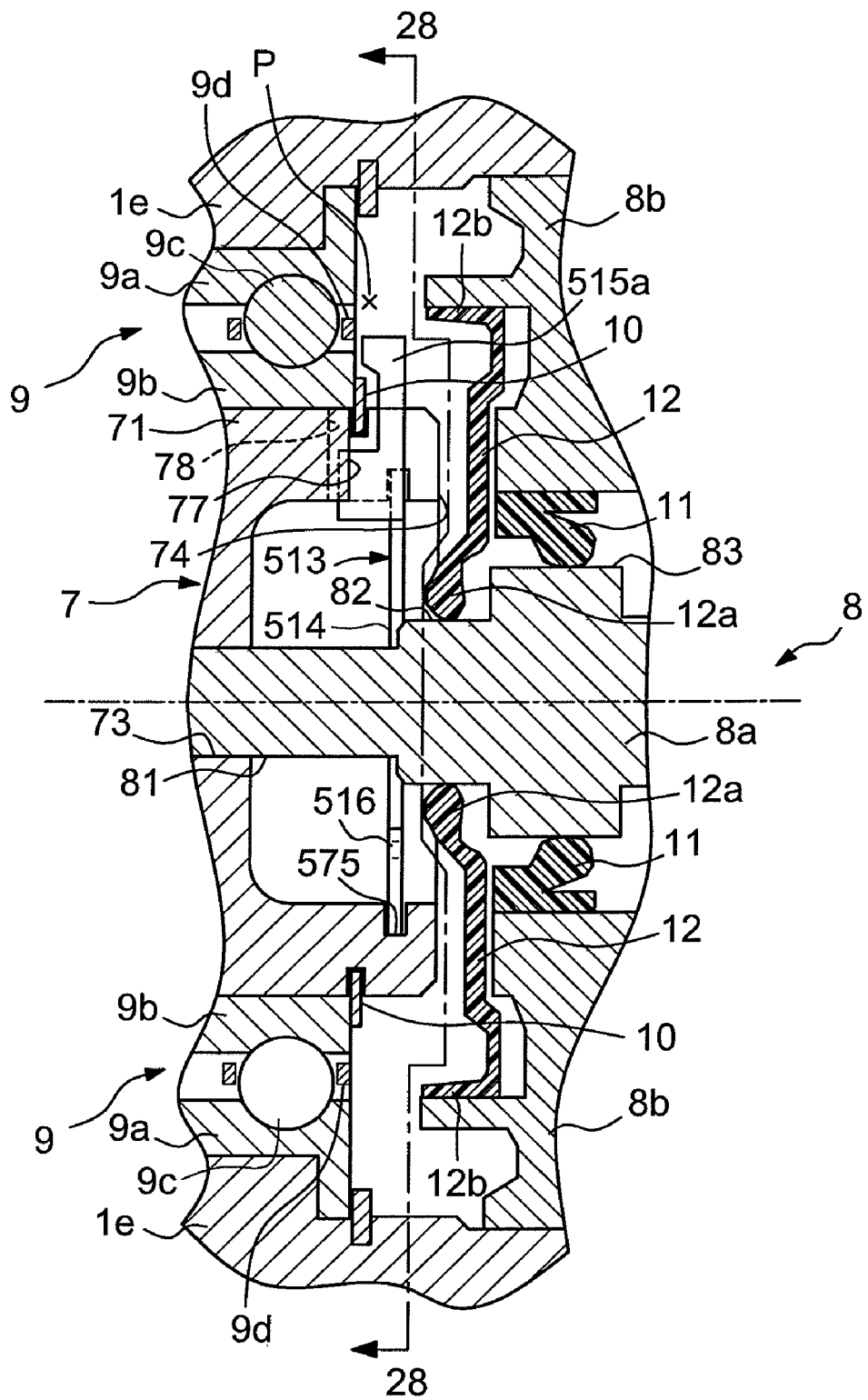
FIG. 26 is an enlarged cross sectional view of a transmission at an area of an input shaft of the transfer device taken along a section line 26-26 in FIG. 28 in accordance with the sixth embodiment of the present invention.
Figure 27:
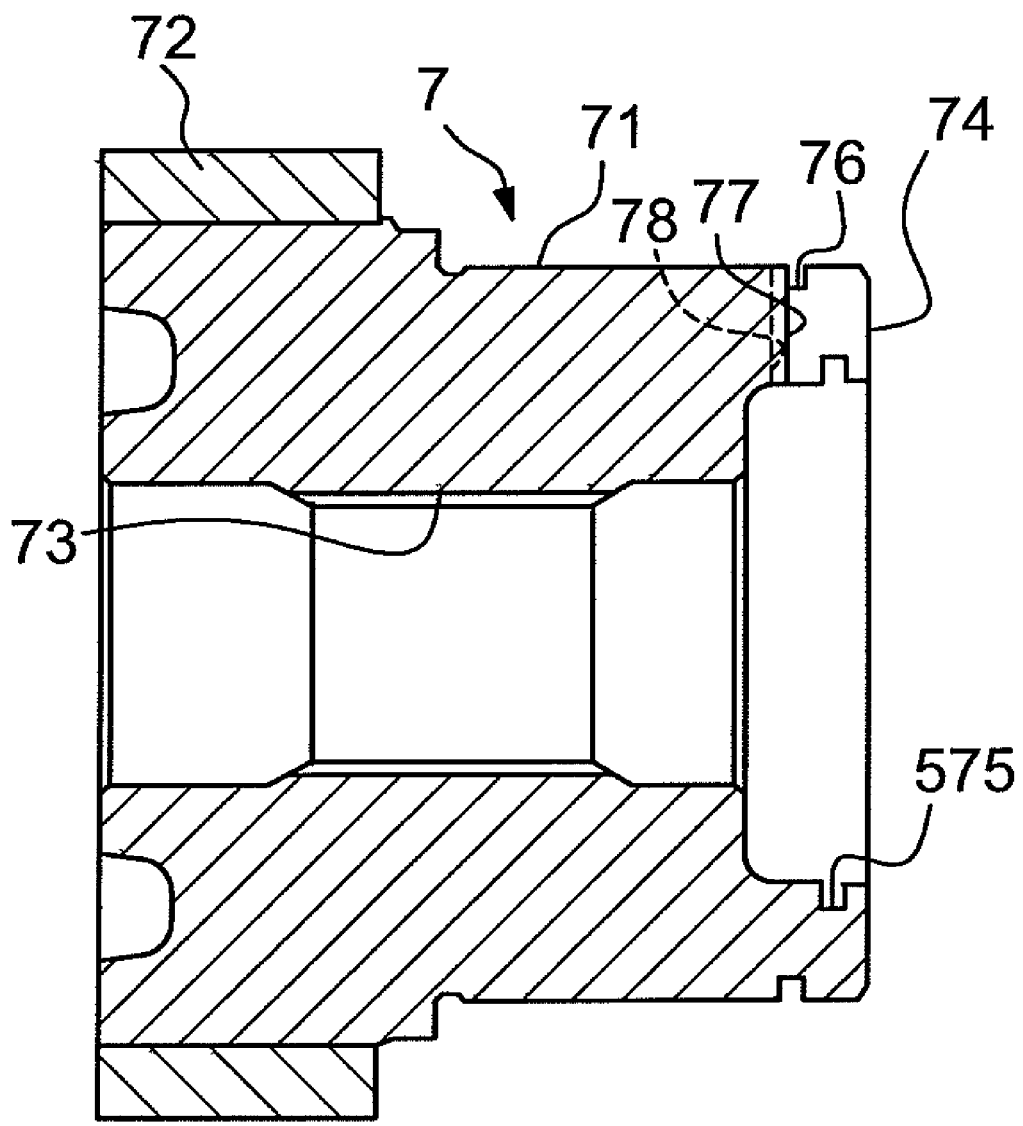
FIG. 27 is an enlarged axial cross sectional view of a driven transmission gear of the transmission in accordance with the sixth embodiment of the present invention.

FIG. 24 is an axial end elevational view of a scraping member 513 of the lubricating system in accordance with the sixth embodiment. FIG. 25 is an elevational view of the scraping member 513 as viewed in a direction of an arrow 25 in FIG. 24. FIG. 26 is an enlarged cross sectional view of the transmission at an area of the input shaft 8a of the transfer device 8 taken along a section line 26-26 in FIG. 28 in accordance with the sixth embodiment. FIG. 27 is an enlarged axial cross sectional view of the driven transmission gear 7 of the transmission in accordance with the sixth embodiment. FIG. 28 is a cross sectional view of the transmission taken along a section line 28-28 in FIG. 26 with selected parts removed for purpose of illustration.

The lubricating system of the sixth embodiment differs from the lubricating system of the first embodiment in the structure of the scarping member 513. More specifically, the scraping member 513 of the sixth embodiment has similar configuration as the scraping member 13 of the first embodiment, except that the thickness and width of the scraping member 13 in the first embodiment are reversed to form the scarping member 513 of the sixth embodiment.

As shown in FIGS. 24 and 25, the scraping member 513 includes a snap-ring part 514, a fin part 515, a protruding strip portion 516 and an engagement strip portion 517. The snap-ring part 514 is arranged as a conventional generally C-shaped snap ring. The engagement strip portion 517 of the scraping member 513 of the sixth embodiment is formed to protrude outwardly in the radial direction from a first open end of the C-shaped snap-ring part 514. The fin part 515 includes an extending strip part 515a that is integrally formed with the engagement strip portion 517 to extend further outward in the radial direction from the engagement strip portion 517. The protruding strip portion 516 is integrally formed on a second open end portion of the C-shaped snap-ring part 514 and bent toward a radial center portion of the snap-ring part 514. The protruding strip portion 516 further includes a bent strip portion 516a formed on the radial inner end (free end) of the protruding strip portion 516, which is bent at about 90° toward the snap-ring part 514.

The scraping member 513 of the sixth embodiment can be manufactured by punching out using a press or other method a plate that has the snap-ring part 514 and the fin part 515 (shown by the alternating double-dotted line in FIG. 24) on the same plane as shown in FIG. 24. The fin part 515 is then formed by bending at about 90° in the axial direction of the snap-ring part 514 relative to the snap-ring part 514. The scraping member 513 as shown in FIGS. 24 and 25 is thereby manufactured more efficiently.

As shown in FIGS. 26, 27 and 28, the driven transmission gear 7 of the sixth embodiment includes the radial notch part 78 within which the engagement strip portion 517 is fitted so that a free end portion of the extending strip part 515a is positioned further outwardly in the radial direction than the inner race 9b of the bearing 9. Moreover, the drive transmission gear 7 includes an annular groove 575 having an axial length arranged to hold the snap-ring part 514 therebetween. Thus, the snap-ring part 514 is elastically fitted within the annular groove 575 of the driven transmission gear 7 as shown in FIG. 26. The protruding strip portion 516 can be used as a knob for detaching the scraping member 13 from the annular groove 575 of the boss part 71 during disassembly for maintenance or other purposes, allowing for improved workability.

When the driven transmission gear 7 rotates in the state in which the scraping member 513 is non-rotatably (with respect to the driven transmission gear 7) assembled in the annular groove 575 of the boss part 71, the lubricating oil discharged from the axial end surface of the bearing 9 is scraped away by the extending strip part 515a. Then, the scraped lubricating oil flows through the radial groove 77 in the axial direction, i.e., toward the lip portion 12a of the oil-seal member 12. Therefore, the lubricating oil can be properly supplied to the lip portion 12a, as in the first embodiment.

In the first through sixth embodiments, the scraping member 13, 213, 313, 413 or 513 is attached to the driven transmission gear 7 by the elasticity of the leaf-spring part 14, 214, 314 or 413, or the snap-ring part 514 However, the structures of the scraping member 13, 213, 313, 413 or 513 are not limited to the illustrated embodiments as long as the fin part 15, 215, 315, 415 or 515 of the scraping member 13, 213, 313, 413 or 513 is configured and arranged to rotate integrally with the driven transmission gear 7. For example, the scraping member 13, 213, 313, 413 or 513 can include only the fin part 15 215, 315, 415 or 515 and be welded or otherwise anchored directly to the axial end surface 74 of the boss part 71 of the driven transmission gear 7, the inner race 9b of the bearing 9, or other members.

In the first through sixth embodiments, the rotation of the scraping member 13, 213, 313, 413 or 513 relative to the driven transmission gear 7 is prevented by fitting the engagement strip portion 17, 317, 417 or 517 into the radial notch part 78, 378, 478, or by fitting the axially-extending part 216b of the protruding strip portion 216 within the notch part 75a. Alternatively, the scraping member 13, 213, 313, 413 or 513 can be welded or otherwise anchored to the driven transmission gear 7, thereby preventing the rotation of the scraping member 13, 213, 313, 413 or 513 relative to the driven transmission gear 7.

In the first through sixth embodiments, the extending strip part 15a, 215a, 315a, 415a or 515a is formed to have a substantially flat surface extending radially outwardly from the engagement strip portion 17, 217, 317, 417 or 517. However, the extending strip part 15a, 215a, 315a, 415a or 515a is not limited to the illustrated embodiments. For example, the extending strip part 15a, 215a, 315a, 415a or 515a can be arranged so that a side surface of the extending strip part 15a, 215a, 315a, 415a or 515a that faces the rotation direction of the driven transmission gear 7 is in the shape of a recessed curve.

In the first through fourth and sixth embodiment, the radial groove 77 or 177 is formed on the axial end surface 74, but the radial groove 77 or 177 need not necessarily be provided. In the first, second, fourth, fifth and sixth embodiments, the protruding strip portion 16, 316, 416, or 516 is formed on the scraping member 13, 313, 413 or 513, but the protruding strip portion 16 need not necessarily be provided.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A lubricating system adapted to supply lubricating oil to a lip portion of an oil-seal member for preventing the lubricating oil from leaking out of a case, the lubricating system comprising:
 a rotating member configured and arranged to be rotatably housed within the case and to slidably engage the lip portion of the oil-seal member, the rotating member including a boss part mounted to the rotating member;
 a bearing rotatably supporting the rotating member, the bearing including
  an inner race coupled to an outer circumferential surface of the boss part of the rotating member,
  an outer race configured and arranged to be coupled to the case, and
  a smoothing member interposed between the inner race and the outer race to smooth a relative rotation between the inner race and the outer race;
 a scraping member configured and arranged to scrape the lubricating oil discharged from the bearing, the scraping member including a fin part disposed in a position corresponding to a discharge part at which the lubricating oil is discharged from the bearing after the bearing has been lubricated, and a fixing part elastically contacting the boss part of the rotating member so that the fin part rotates integrally with the rotating member; and
 a guiding section configured and arranged to guide the lubricating oil scraped by the scraping member to the lip portion of the oil-seal member.

2. The lubricating system according to claim 1, wherein the fin part of the scraping member is slanted so that a distal end portion of the fin part is oriented toward a rotation direction of the rotating member with respect to a base end portion of the fin part.

3. The lubricating system according to claim 1, wherein the fin part includes a distal end portion protruding further outward in the radial direction at least beyond an outer circumferential surface of the inner race of the bearing.

4. The lubricating system according to claim 1, wherein the rotating member includes
 a gear formed on the outer circumferential surface of the and
 a rotating shaft having a smaller diameter than the boss part and concentrically fitted into the gear to rotate integrally with the gear, the rotating shaft including a sliding surface that is configured and arranged to slidably engage with the lip portion.

5. The lubricating system according to claim 1, wherein the fin part of the scraping member is integrally formed with the fixing part of the scraping member.

6. The lubricating system according to claim 1, wherein the fixing part of the scraping member includes a generally C-shaped part, and
the fin part includes an extending strip portion that extends outwardly in the radial direction from a first open end portion of the C-shaped part.

7. The lubricating system according to claim 1, wherein the guiding section includes a radial groove formed on an axial end surface of the boss part of the gear, the radial groove being configured and arranged to face the lip portion of the oil-seal member, and to guide the lubricating oil scraped by the fin part inwardly in the radial direction of the gear.

8. The lubricating system according to claim 7, wherein the radial groove extends along the fin part of the scraping member.

9. The lubricating system according to claim 7, wherein a bottom surface of the radial groove is slanted so that a radial inward end portion of the radial groove is shallower than a radial outward end portion of the radial groove.

10. The lubricating system according to claim 6, wherein the C-shaped part of the scraping member is fitted into an annular groove formed on the inner circumferential surface of the boss part of the gear.

11. The lubricating system according to claim 6, wherein the C-shaped part of the scraping member includes a protruding strip portion that protrudes inwardly in the radial direction from a second open end portion of the C-shaped part.

12. The lubricating system according to claim 11, wherein the protruding strip portion of the C-shaped part further extends in an axial direction toward the lip portion of the oil-seal member.

13. The lubricating system according to claim 6, wherein the fin part engages with a radial notch part formed in the axial end surface of the boss part of the gear that is configured and arranged to face the lip portion of the oil-seal member.

* * * * *